US011933412B2

(12) United States Patent
Combs

(10) Patent No.: US 11,933,412 B2
(45) Date of Patent: Mar. 19, 2024

(54) ACTUATING ASSEMBLY FOR AN INTERNAL VALVE

(71) Applicant: Engineered Controls International, LLC, Elon, NC (US)

(72) Inventor: Elijah Marshall Combs, Mount Airy, NC (US)

(73) Assignee: Engineered Controls International, LLC, Elon, NC (US)

( * ) Notice: Subject to any disclaimer, the term of this patent is extended or adjusted under 35 U.S.C. 154(b) by 0 days.

(21) Appl. No.: 17/812,654

(22) Filed: Jul. 14, 2022

(65) Prior Publication Data

US 2023/0019384 A1 Jan. 19, 2023

Related U.S. Application Data

(60) Provisional application No. 63/203,311, filed on Jul. 16, 2021.

(51) Int. Cl.
*F16K 17/04* (2006.01)
*F16K 15/18* (2006.01)
(Continued)

(52) U.S. Cl.
CPC ........ *F16K 17/0486* (2013.01); *F16K 15/182* (2021.08); *F16K 31/52408* (2013.01); *F16K 3/184* (2013.01); *F16K 31/52475* (2013.01)

(58) Field of Classification Search
CPC .... F16K 17/0486; F16K 15/182; F16K 15/18; F16K 31/52408; F16K 3/184; F16K 31/52475
See application file for complete search history.

(56) References Cited

U.S. PATENT DOCUMENTS 1,465,645 A * 8/1923 Kneass ............. F16K 31/52408
251/259
1,647,334 A * 11/1927 Bart .................. F16K 31/52408
137/625.26
(Continued)

FOREIGN PATENT DOCUMENTS

CA  2990925   7/2019
EP  2765114   8/2014
(Continued)

OTHER PUBLICATIONS

International Search Report and Written Opinion for PCT/US2022/073738 dated Oct. 24, 2022, 15 pp.
(Continued)

*Primary Examiner* — David Colon-Morales
(74) *Attorney, Agent, or Firm* — Neal, Gerber & Eisenberg LLP

(57) ABSTRACT

A valve actuating assembly is provided that comprises a cam holder positioned within a valve body of an internal valve, a cam operably coupled to the cam holder and configured to engage a valve stem of the internal valve for moving the internal valve between a first position and a second position, and an actuating shaft extending through at least a portion of the valve body, rotation of the actuating shaft causing rotation of the cam holder and the cam, wherein the actuating shaft is removably coupled to the cam holder such that the actuating shaft can be decoupled from the cam holder and removed from the valve body, the cam holder and the cam being configured to remain positioned within the valve body when the actuating shaft is decoupled from the cam holder and removed from the valve body.

20 Claims, 17 Drawing Sheets

(51) Int. Cl.
*F16K 31/524* (2006.01)
*F16K 3/18* (2006.01)

(56) References Cited

U.S. PATENT DOCUMENTS

| | | | | |
|---|---|---|---|---|
| 1,775,499 | A * | 9/1930 | Rosenthal | F16K 31/52408 |
| | | | | 251/257 |
| 2,075,812 | A | 4/1937 | Kerr et al. | |
| 2,446,334 | A * | 8/1948 | Koehler | F16K 31/52408 |
| | | | | 251/259 |
| 2,834,371 | A | 5/1958 | Liljestrand | |
| 2,954,205 | A | 9/1960 | Musser | |
| 3,078,875 | A * | 2/1963 | Farrell | F16K 27/02 |
| | | | | 137/630.15 |
| 3,219,312 | A * | 11/1965 | Koehler | F16K 31/52408 |
| | | | | 251/259 |
| 3,346,232 | A | 10/1967 | Cator | |
| 3,351,086 | A * | 11/1967 | Baker | F16K 31/52408 |
| | | | | 137/501 |
| 3,566,907 | A | 3/1971 | Sime et al. | |
| 3,631,893 | A * | 1/1972 | Seaman | F16K 31/52408 |
| | | | | 137/601.15 |
| 3,664,378 | A | 5/1972 | Brecht, Jr. | |
| 3,811,279 | A | 5/1974 | Vogeli | |
| 3,814,375 | A | 6/1974 | Grotloh | |
| 3,844,312 | A * | 10/1974 | Sumner | F16K 17/30 |
| | | | | 137/460 |
| 3,884,251 | A | 5/1975 | Knight | |
| 4,060,453 | A | 11/1977 | Schabert et al. | |
| 4,490,836 | A | 12/1984 | Grotloh | |
| 4,539,928 | A | 9/1985 | Todhunter et al. | |
| 4,580,596 | A * | 4/1986 | Stehling | F16K 15/18 |
| | | | | 251/83 |
| 5,113,899 | A * | 5/1992 | Yonezawa | F16K 15/18 |
| | | | | 251/297 |
| 5,178,185 | A * | 1/1993 | Stehling | F16K 15/18 |
| | | | | 251/285 |
| 5,286,000 | A | 2/1994 | Katz | |
| 6,557,580 | B2 | 5/2003 | Lohde et al. | |
| 7,300,034 | B2 | 11/2007 | Shields | |
| 8,087,640 | B2 | 1/2012 | Bassols | |
| 8,146,885 | B2 | 4/2012 | Lin et al. | |
| 8,256,462 | B2 | 9/2012 | Lin et al. | |
| 8,353,310 | B2 * | 1/2013 | Lin | F16K 1/126 |
| | | | | 137/460 |
| 8,517,046 | B2 * | 8/2013 | Lin | F16K 1/385 |
| | | | | 137/329.02 |
| 8,556,233 | B2 | 10/2013 | Lin et al. | |
| 8,671,988 | B2 | 3/2014 | Lin et al. | |
| 8,733,735 | B2 | 5/2014 | Strebe | |
| 8,757,191 | B2 | 6/2014 | Baxendell et al. | |
| 8,887,655 | B2 | 11/2014 | Carlson et al. | |
| 8,919,369 | B2 | 12/2014 | Lin et al. | |
| 8,960,224 | B2 | 2/2015 | Case et al. | |
| 8,973,600 | B2 | 3/2015 | Esveldt | |
| 9,133,941 | B2 | 9/2015 | Lin et al. | |
| 9,144,698 | B2 | 9/2015 | Baxendell et al. | |
| 9,360,131 | B2 | 6/2016 | Nashery et al. | |
| 9,403,922 | B2 | 8/2016 | Masakazu et al. | |
| 9,476,518 | B2 * | 10/2016 | Blanchard | F16K 41/00 |
| 9,581,228 | B2 * | 2/2017 | Nashery | F16K 39/024 |
| 9,732,877 | B2 | 8/2017 | Lucchesi | |
| 9,810,346 | B2 | 11/2017 | Scherer et al. | |
| 10,012,132 | B2 | 7/2018 | Yumisashi et al. | |
| 10,054,246 | B2 | 8/2018 | Iizuka | |
| 10,215,136 | B2 | 2/2019 | Grabowska et al. | |
| 10,287,761 | B2 | 5/2019 | Yuan et al. | |
| 10,295,078 | B2 | 5/2019 | Case et al. | |
| 10,295,081 | B2 * | 5/2019 | Ji | F16K 31/1221 |
| 10,323,771 | B2 | 6/2019 | Kunita et al. | |
| 10,344,884 | B2 | 7/2019 | Harck et al. | |
| 10,465,803 | B2 | 11/2019 | Clement et al. | |
| 10,480,667 | B2 * | 11/2019 | Mitchell | F16K 31/06 |
| 10,480,682 | B2 * | 11/2019 | Ji | F16K 27/07 |
| 10,563,786 | B2 * | 2/2020 | Chen | F16K 27/02 |
| 10,589,207 | B2 | 3/2020 | Jin-Suk | |
| 10,619,757 | B2 | 4/2020 | Thybo et al. | |
| 10,641,404 | B2 * | 5/2020 | Ji | F16K 39/024 |
| 10,738,905 | B2 | 8/2020 | Takafumi et al. | |
| 10,767,788 | B2 | 9/2020 | Ji et al. | |
| 10,794,505 | B2 * | 10/2020 | Li | F16K 31/52408 |
| 10,844,966 | B2 | 11/2020 | Clement et al. | |
| 10,962,137 | B2 | 3/2021 | Awasthi et al. | |
| 2006/0266963 | A1 | 11/2006 | Shields | |
| 2010/0084029 | A1 | 4/2010 | Lin et al. | |
| 2010/0252115 | A1 | 10/2010 | Bassols | |
| 2011/0203685 | A1 | 8/2011 | Lin et al. | |
| 2012/0119131 | A1 | 5/2012 | Strebe | |
| 2013/0043420 | A1 | 2/2013 | Case et al. | |
| 2013/0068976 | A1 | 3/2013 | Esveldt | |
| 2013/0146314 | A1 | 6/2013 | Baxendell et al. | |
| 2013/0187073 | A1 | 7/2013 | Carlson et al. | |
| 2014/0224353 | A1 | 8/2014 | Strebe | |
| 2014/0238708 | A1 | 8/2014 | Baxendell et al. | |
| 2015/0053878 | A1 | 2/2015 | Lucchesi | |
| 2015/0129062 | A1 | 5/2015 | Case et al. | |
| 2016/0138729 | A1 | 5/2016 | Ismail et al. | |
| 2016/0312913 | A1 | 10/2016 | Thybo et al. | |
| 2016/0356394 | A1 | 12/2016 | Iizuka | |
| 2017/0016381 | A1 | 1/2017 | Yumisashi et al. | |
| 2017/0102095 | A1 | 4/2017 | Kunita et al. | |
| 2017/0167624 | A1 | 6/2017 | Harck et al. | |
| 2017/0211522 | A1 | 7/2017 | Grabowska et al. | |
| 2017/0248246 | A1 | 8/2017 | Valentin | |
| 2018/0094733 | A1 | 4/2018 | Clement et al. | |
| 2018/0094735 | A1 | 4/2018 | Clement et al. | |
| 2018/0094736 | A1 | 4/2018 | Clement et al. | |
| 2018/0094737 | A1 | 4/2018 | Clement et al. | |
| 2018/0127960 | A1 | 5/2018 | Yuan et al. | |
| 2018/0259078 | A1 | 9/2018 | Li et al. | |
| 2019/0024819 | A1 | 1/2019 | Awasthi et al. | |
| 2019/0234314 | A1 | 8/2019 | Crowley | |
| 2019/0309872 | A1 | 10/2019 | Hauk et al. | |
| 2020/0041182 | A1 | 2/2020 | Danielson et al. | |
| 2020/0208751 | A1 | 7/2020 | Minato et al. | |

FOREIGN PATENT DOCUMENTS

| | | | | |
|---|---|---|---|---|
| EP | | 3273830 | 1/2018 | |
| EP | | 3273830 B1 * | 4/2019 | A47J 31/461 |
| WO | WO1992008919 | | 5/1992 | |
| WO | WO2006130210 | | 12/2006 | |
| WO | WO2010042276 | | 4/2010 | |
| WO | WO2011065664 | | 6/2011 | |
| WO | WO2013025706 | | 2/2013 | |
| WO | WO2013150552 | | 10/2013 | |
| WO | WO2014119432 | | 8/2014 | |
| WO | WO2014189463 | | 11/2014 | |
| WO | WO2015091691 | | 6/2015 | |
| WO | WO2015198963 | | 12/2015 | |
| WO | WO2016032775 | | 3/2016 | |
| WO | WO2016034418 | | 3/2016 | |
| WO | WO2016035067 | | 3/2016 | |
| WO | WO2017154390 | | 9/2017 | |
| WO | WO2018012742 | | 1/2018 | |
| WO | WO2018111672 | | 6/2018 | |
| WO | WO2018216526 | | 11/2018 | |
| WO | WO2020026074 | | 2/2020 | |

OTHER PUBLICATIONS

Internal Valves Type C407-10, Instruction Manual (English), Emerson Process Management Regulator Technologies, Inc., 2015, 12 pp.
Internal Valves Type C407-10, Instruction Manual (Spanish), Fisher Controls International, 2004, 12 pp.
Rego Products, Manual Internal Valves, A3200 Series, Catalog, 2000, 15 pp.

* cited by examiner

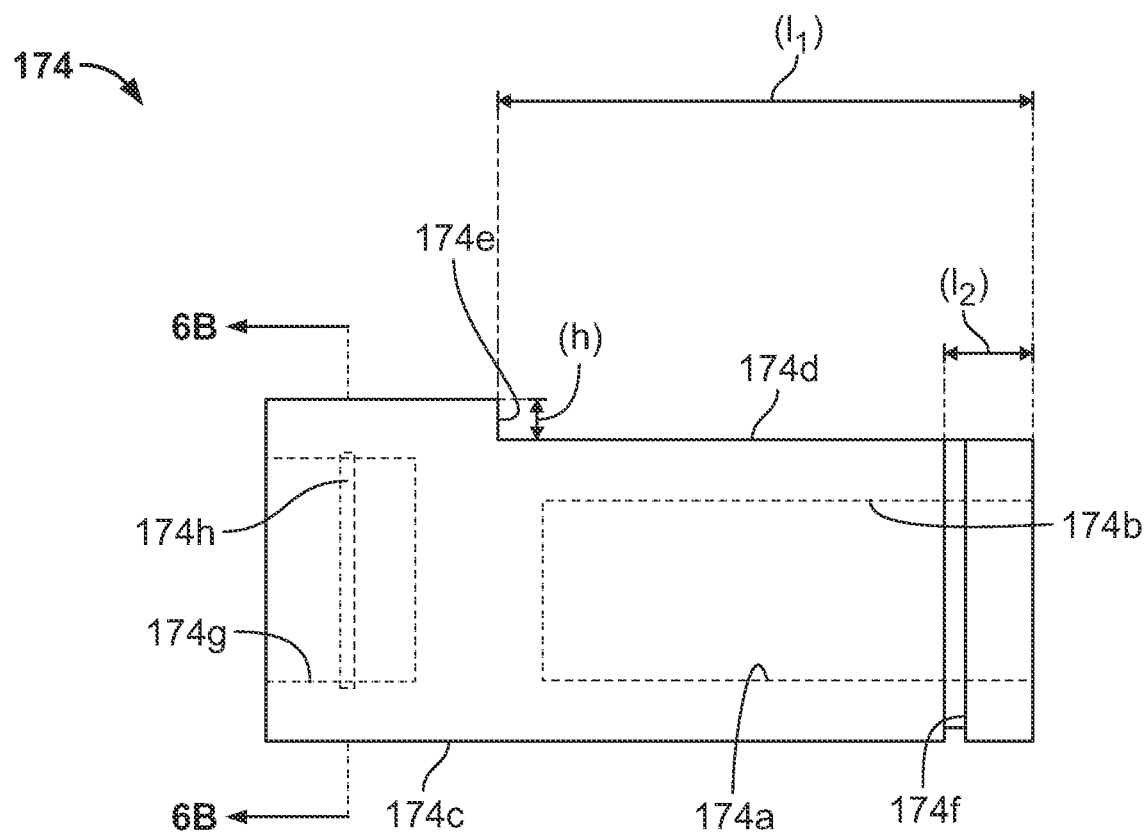
FIG. 6A
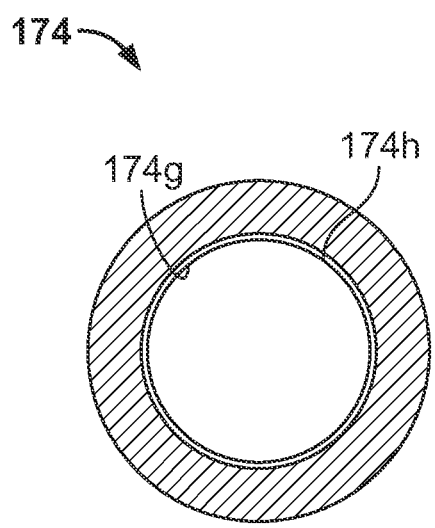 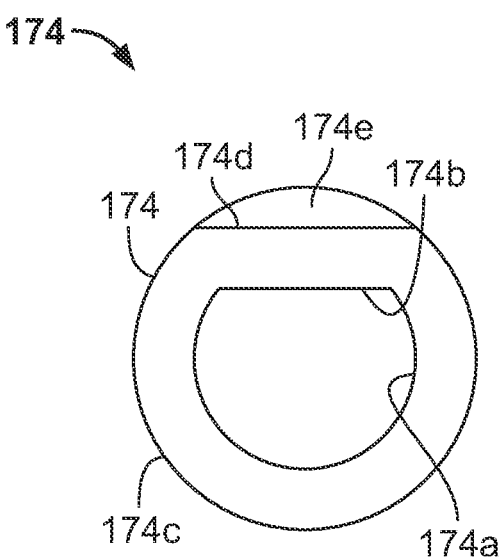
FIG. 6B　　　　　　　　FIG. 6C

ACTUATING ASSEMBLY FOR AN INTERNAL VALVE

CROSS-REFERENCE

This application claims the benefit of U.S. Provisional Patent App. No. 63/203,311, filed on Jul. 16, 2021. This prior application is incorporated by reference herein in its entirety.

TECHNICAL FIELD

This disclosure generally relates to internal valves and actuating assemblies for interval valves that actuate the valve between closed and open valve positions.

BACKGROUND

Internal valves are commonly used to control fluid and gas withdrawal on bobtail delivery trucks, pressurized fluid and gas transports, storage tanks, in-line fluid and gas transfer systems, and other such pressurized fluid and gas systems. During operation, internal valves are typically held in the closed position to prevent unwanted fluid and gas transfer. Accordingly, a valve actuating assembly is incorporated with the valve to actuate valve components between closed, open, and venting positions. In one example, the valve actuating assembly can be configured as a manually actuated assembly that includes a handle or other such mechanism operably coupled to a rotatable shaft. As such, an operator can manually actuate the valve actuating assembly to open, close, and/or vent the valve. Additionally, or alternatively, the internal valve can use a pneumatic actuator assembly or other such actuator connected to the valve that enables remote and/or automatic operation of the valve actuating assembly to open, close, and/or vent the valve.

SUMMARY

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

The present disclosure relates to an actuating assembly for use with an internal valve coupled to a compressed liquid and/or gas storage/dispensing system. In various embodiments, the internal valve comprises a valve body including a plurality of inner surfaces that define a passage through the valve body and a valve seat disposed within the valve body and adjacent an inlet of the passage. The valve further includes a valve bonnet operatively coupled to the valve body and a valve stem operatively coupled to the valve bonnet. A poppet is connected to and movable with the valve stem between a first position in which the poppet sealingly engages the valve seat and a second position in which the poppet is disengaged from the valve seat. The internal valve further includes a valve actuating assembly operatively engaged to the valve stem to move the valve stem and the poppet between the first position and the second position. The valve actuating assembly includes a cam holder positioned in the passage of the valve body, a cam operably coupled to the cam holder and engaged with the valve stem, and an actuating shaft extending through a portion of the passage and removably coupled to the cam holder. Rotation of the actuating shaft causes a rotation of the cam holder and cam that causes the valve stem and the poppet to move between the first position and the second position. The cam holder and the cam remain positioned in the passage and engaged to the valve stem when the actuating shaft is decoupled from the cam holder and removed from the portion of the passage.

One exemplary embodiment provides a valve actuating assembly for actuating an internal valve between a closed position and an open position, the valve actuating assembly comprising: a cam holder stem securely connected to a valve body of the internal valve; a cam holder having a first end and a second end, the first end of the cam holder operably coupled to a portion of the cam holder stem to position the cam holder within the valve body of the internal valve; a cam operably mounted to the cam holder; and an actuating shaft extending through at least a portion of the valve body of the internal valve, the actuating shaft removably coupled to the second end of the cam holder such that the actuating shaft can be decoupled from the cam holder and removed from the valve body, wherein the cam holder and the cam are configured to remain connected to the cam holder stem and remain positioned within the valve body when the actuating shaft is decoupled from the cam holder and removed from the valve body.

In accordance with one or more aspects, the actuating shaft comprises a cam holder connection portion having a non-circular shape configured to removably couple the actuating shaft to a corresponding bore formed in the second end of the cam holder.

In accordance with various aspects, the valve actuation assembly further comprises a retaining ring configured to operably hold the cam to the cam holder, wherein the cam holder comprises a retaining ring groove defined in an outer surface of the cam holder and configured to receive the retaining ring.

In accordance with one or more aspects, the cam holder stem is configured to support the cam holder and the cam within the valve body when the actuating shaft is decoupled from the cam holder and removed from the valve body.

In accordance with various aspects, the valve actuation assembly further comprises a locking ring configured to operably attach the cam holder stem to the cam holder, wherein the cam holder stem comprises a locking ring groove defined in an outer surface of the cam holder stem and configured to receive the locking ring.

In accordance with various aspects, the valve actuation assembly further comprises a plurality of pins coupled to holes extending through an outer surface of the cam holder, the plurality of pins being configured to operably secure the cam holder to the cam holder stem.

In accordance with one or more aspects, the cam includes a non-circular bore configured to receive a non-circular end of the cam holder. According to one aspect, the non-circular end of the cam holder includes a non-circular opening for receiving a cam holder connection portion of the actuating shaft.

In accordance with one or more aspects, the cam holder stem comprises: a first end operably coupled to the first end of the cam holder, and a second end threadably engaged to the valve body to secure the cam holder stem to the valve body.

Another exemplary embodiment provides a valve actuating assembly for actuating an internal valve between a first position and a second position, the valve actuating assembly comprising: a cam holder positioned within a valve body of the internal valve, a cam operably coupled to the cam holder and configured to engage a valve stem of the internal valve for moving the internal valve between the first position and the second position, and an actuating shaft extending through at least a portion of the valve body of the internal valve, rotation of the actuating shaft causing rotation of the cam holder and the cam, wherein the actuating shaft is removably coupled to the cam holder such that the actuating shaft can be decoupled from the cam holder and removed from the valve body, and wherein the cam holder and the cam are configured to remain positioned within the valve body of the internal valve when the actuating shaft is decoupled from the cam holder and removed from the valve body.

In accordance with one or more aspects, the actuating shaft comprises a cam holder connection portion having a non-circular shape configured to removably couple the actuating shaft to a corresponding bore formed in the cam holder.

In accordance with various aspects, the valve actuating assembly further comprises a retaining ring configured to operably hold the cam to the cam holder, wherein the cam holder comprises a retaining ring groove defined in an outer surface of the cam holder and configured to receive the retaining ring.

In accordance with various aspects, the valve actuating assembly further comprises a cam holder stem operatively coupled to the cam holder and the valve body, wherein the cam holder stem is configured to support the cam holder and the cam within the valve body when the actuating shaft is decoupled from the cam holder and removed from the valve body of the internal valve. In accordance with some aspects, the valve actuating assembly further comprises a locking ring configured to operably attach the cam holder stem to the cam holder, wherein the cam holder stem comprises a locking ring groove defined in an outer surface of the cam holder stem and configured to receive the locking ring. In accordance with some aspects, the valve actuating assembly further comprises a plurality of pins coupled to holes extending through an outer surface of the cam holder, the plurality of pins being configured to operably secure the cam holder to the cam holder stem. In accordance with some aspects, the cam holder stem comprises: a first end operably coupled to a first end of the cam holder, and a second end threadably engaged to the valve body of the internal valve to secure the cam holder stem to the valve body.

In accordance with various aspects, the cam includes a non-circular bore configured to receive a non-circular end of the cam holder. In accordance with one aspect, the non-circular end of the cam holder includes a non-circular opening configured to receive a cam holder connection portion of the actuating shaft.

Another exemplary embodiment provides an internal valve for conveying fluid, the internal valve having a closed position and an open position, the internal valve comprising: a valve body comprising a plurality of inner surfaces that define a passage through the valve body, a valve seat disposed adjacent an inlet of the passage, a valve stem, and a poppet connected to and moveable with the valve stem between a first position in which the poppet sealingly engages the valve seat and a second position in which the poppet is disengaged from the valve seat; and a valve actuating assembly operatively engaged to the valve stem to move the valve stem and the poppet between the first position and the second position, the valve actuating assembly comprising: a cam holder positioned in the passage of the valve body, a cam operably coupled to the cam holder and engaged with the valve stem, an actuating shaft extending through a portion of the passage and removably coupled to the cam holder, and a cam holder stem configured to securely couple the cam holder to the valve body, wherein rotation of the actuating shaft causes a rotation of the cam holder and the cam to cause the valve stem and the poppet to move between the first position and the second position, and wherein the cam holder and the cam remain positioned in the passage and engaged to the valve stem when the actuating shaft is decoupled from the cam holder and removed from the portion of the passage.

In accordance with various aspects, the cam holder stem is configured to support the cam holder and the cam within the valve body when the actuating shaft is decoupled from the cam holder and removed from the portion of the passage.

BRIEF DESCRIPTION OF THE DRAWINGS

FIG. 6A is a side view of an exemplary cam holder of the valve actuating assembly of FIGS. 4A and 4B.

FIG. 6B is a cross-sectional end view of one end of the cam holder of FIG. 6A.

FIG. 6C is an end view of another end of the cam holder of FIG. 6A.

DETAILED DESCRIPTION

Figure 1:
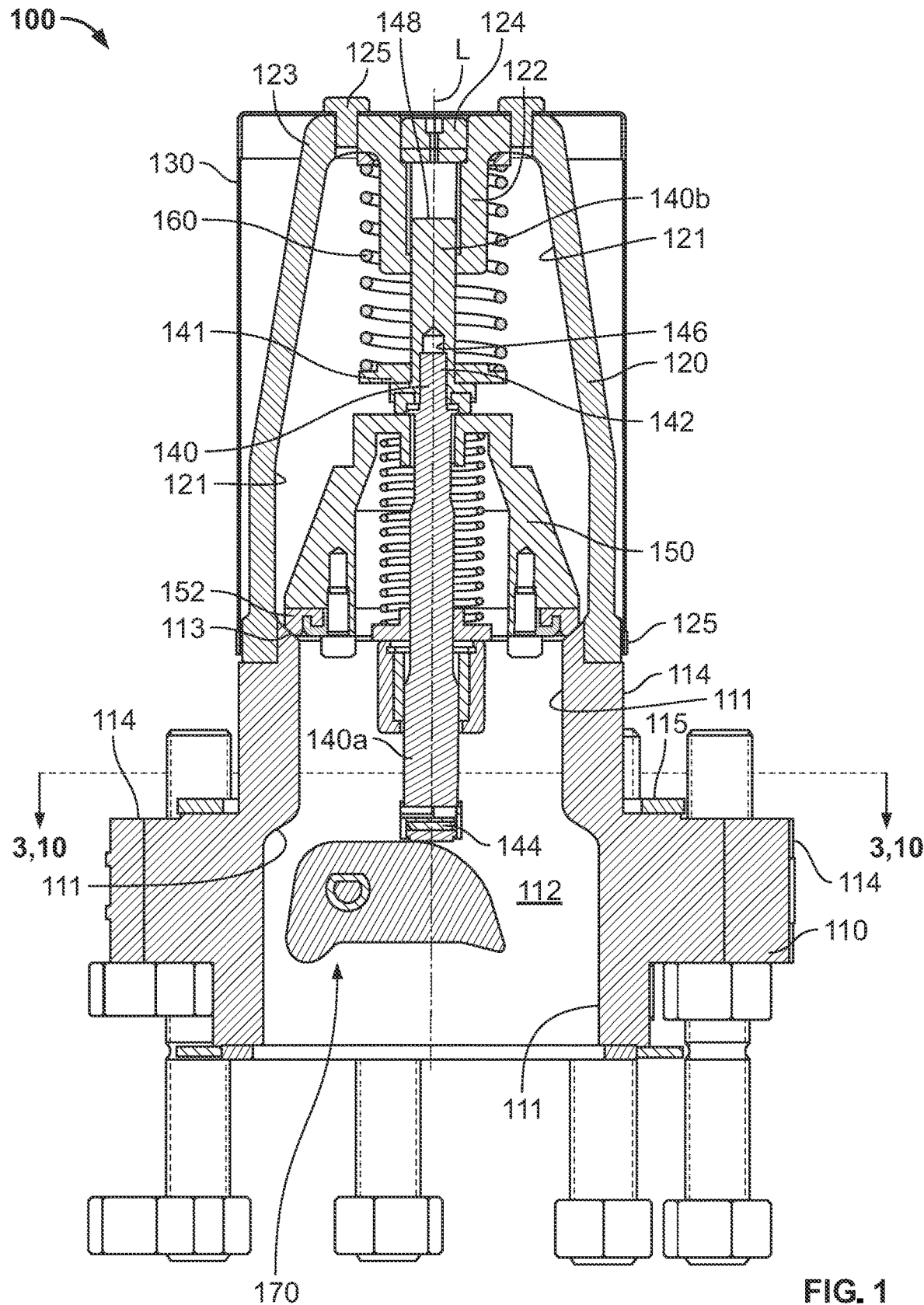
FIG. 1 is a cross-sectional side view of an exemplary internal valve incorporating an exemplary valve actuating assembly.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

Figure 2:
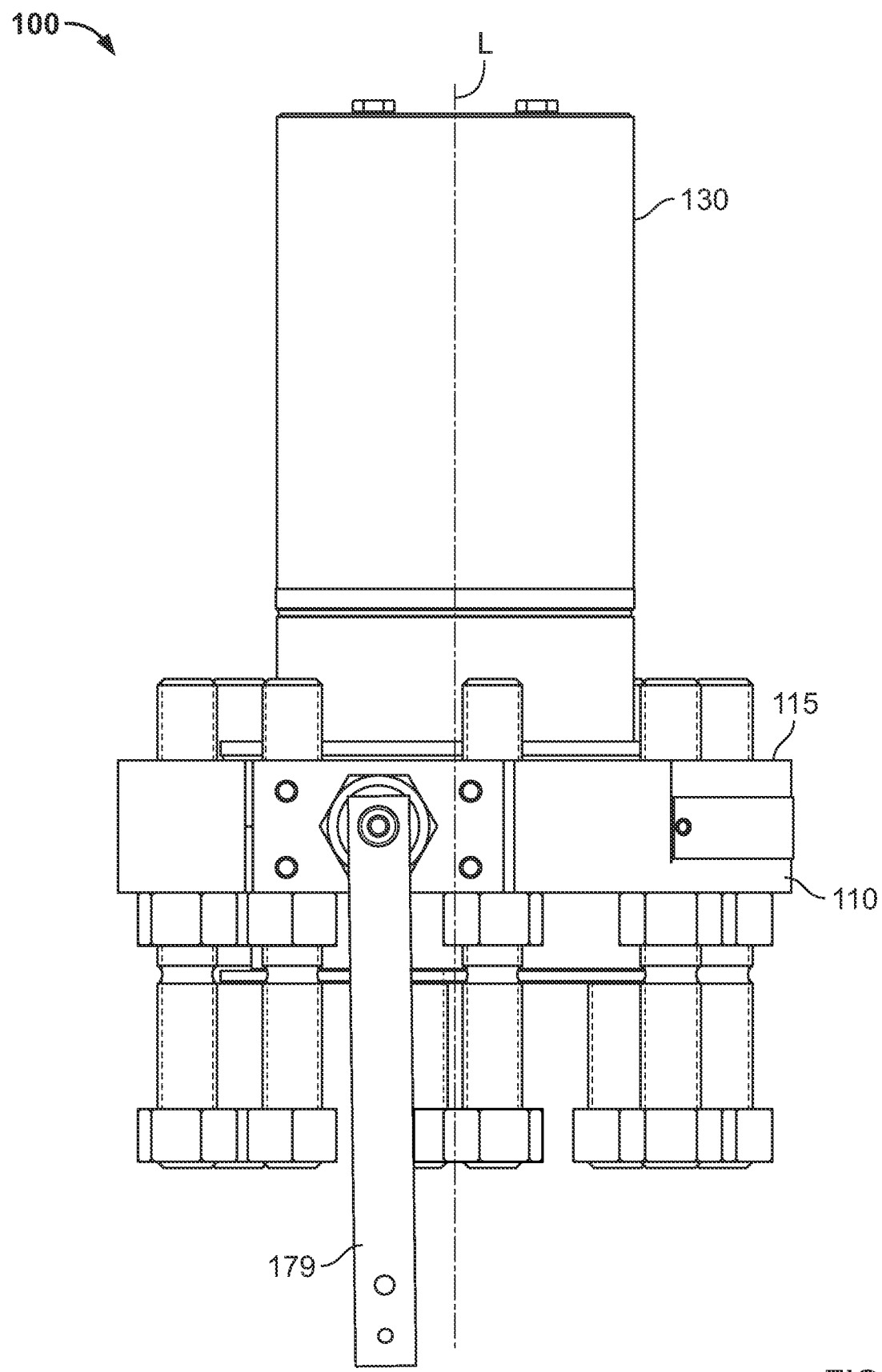
FIG. 2 is an external side view of the internal valve of FIG. 1.

FIGS. 1 and 2 illustrate one exemplary embodiment of an internal valve 100. The internal valve 100 (sometimes referred to herein as valve 100 for brevity) includes a valve body 110, a bonnet 120, a valve screen 130, a valve stem 140, a poppet 150, a spring 160, and a valve actuating assembly 170. In the illustrated example, valve body 110 includes a plurality of inner surfaces 111 that may be parallel, perpendicular, and/or sloped with respect to a longitudinal axis L. The plurality of inner surfaces 111 define a void or passage 112 within valve body 110, and the passage 112 has an inlet and an outlet that enables fluid and/or gas to flow through valve body 110. In the illustrated example, the inner surfaces 111 also define a valve seat 113 adjacent to the inlet of passage 112. It will be understood that while valve seat 113 is shown as an integral component formed in the valve body, other embodiments can use a valve seat formed as a separate component that is disposed in the valve body and positioned adjacent to the inlet, outlet or other such location within valve body 110.

In the illustrated example, when valve 100 is in the closed position (FIG. 1), poppet 150 is sealingly engaged with valve seat 113 to prevent fluid and/or gas from flowing through the passage of valve body 110. Conversely, when valve 100 is in the open position, valve actuating assembly 170 causes poppet 150 to disengage from valve seat 113 (not shown) such that fluid and/or gas enters the inlet, flows through the passage 112, and exits the passage 112 via the outlet. In the illustrated example, body 110 also includes multiple outer surfaces 114 that may be parallel, perpendicular, and or sloped with respect to the longitudinal axis L. The plurality of outer surfaces 114 may define a mounting flange 115 that can be used with one or more fasteners (not labeled) to couple or otherwise fasten the valve 100 to a fluid conduit, storage tank, fluid transport, bobtail delivery truck, or other such pressurized fluid and/or gas storage receptacle.

In the illustrated embodiment, bonnet 120 is coupled to or otherwise attached to the body 110 and defines a support structure for valve stem 140, poppet 150, and spring 160. More specifically, a plurality of inner surfaces 121 of the bonnet 120 define a spring guide and stem engagement member 122 configured to receive and position spring 160 and valve stem 140 within valve 100. The bonnet 120 further includes a set screw 124 positioned in the spring guide and stem engagement member 122 that can be adjusted to increase and decrease a travel amount of the valve stem 140.

In the illustrated embodiment the valve screen 130 is connected, via a plurality of fasteners 125, to the valve body 110 and a portion of an outer surface 123 of the bonnet 120. The valve screen 130 is configured to filter or remove particles and other such contaminants present in the fluid and/or gas that flows through the valve 100. It will be understood that while valve 100 includes the valve screen 130 operatively coupled to valve body 110 and bonnet 120, in certain other embodiments, the valve in accordance with the present disclosure can be configured without a valve screen.

In the illustrated embodiment, valve stem 140 includes a lower valve stem 140a and an upper valve stem 140b positioned within at least a portion of the valve body 110. In the illustrated embodiment, lower valve stem 140a includes an upper stem engagement member 142 defined at a first end of lower valve stem 140a and an actuating assembly engagement member 144 defined at a second end of lower valve stem 140a. In the illustrated embodiment, upper valve stem 140b includes a plurality of threaded interior surfaces 146 that define a lower stem receiving bore (not labeled) at a first end of the upper valve stem 140b and a bonnet engagement member 148 defined at a second end of the upper valve stem 140b. As such, upper stem engagement member 142 is threaded into or otherwise received by the threaded interior surfaces 146 of the lower stem receiving bore to operatively couple lower valve stem 140a to upper valve stem 140b. In the illustrated embodiment, the actuating assembly engagement member 144 of lower valve stem 140a is engaged with valve actuating assembly 170, and the bonnet engagement member 148 of the upper valve stem 140b is slidingly engaged with the spring guide and stem engagement member 122.

In the illustrated embodiment, poppet 150 is mounted on and operably coupled to lower valve stem 140a. Seat disc 152 is coupled to or otherwise attached to the poppet 150. In the illustrated example, seat disc 152 is an annular structure coupled to at least a portion of a bottom surface of poppet 150 and seat disc 152 is configured to sealingly engage with the valve seat 113 to form a fluid-tight seal. Accordingly, when valve 100 is in the closed position, seat disc 152 sealingly engages with valve seat 113 to form a fluid-tight seal between the 150 and valve body 110 to prevent fluid and/or gas from flowing through passage 112. Conversely, when valve 100 is in the open position, lower valve stem 140a and poppet 150 move axially away from valve seat 113 such that seat disc 152 disengages from the valve seat 113 to enable the flow of fluid and/or gas through passage 112 of valve body 110.

In the illustrated example, spring 160 is disposed between poppet 150 and bonnet 120. More specifically, at least a portion of a first end of the spring 160 is mounted onto the spring guide and stem engagement member 122 of the bonnet 120 and a second end of the spring 160 is engaged to a spring receiver 141 of the upper valve stem 140b. As such, a biasing force generated by the spring 160 acts on the spring receiver 141 to bias the upper valve stem 140b, lower valve stem 140a, and poppet 150 downwards toward the valve seat 113. The biasing force generated by the spring 160 causes the seat disc 152 to sealingly engage with the valve seat 113

As best shown in FIGS. 2, 3, 4A, and 4B, valve actuating assembly 170 includes an actuating shaft 172, a cam holder 174 coupled to the actuating shaft 172, a cam 176 mounted to the cam holder 174, a cam holder stem 178 coupled to the cam holder 174 and the valve body 110, and an actuating member or handle 179 coupled to an end of the actuating shaft 172. It will be appreciated that while valve actuating assembly 170 is configured as a manual actuating assembly that uses the actuating member 179 operated by a user, other embodiments may use a pneumatic actuating assembly, linear actuating assembly, solenoid actuating assembly, or other such actuating assembly to actuate the valve 100.

In the illustrated embodiment, actuating shaft 172 extends through at least a portion of the valve body 110 such that a first end of actuating shaft 172 is positioned within the valve body 110 and a second end of actuating shaft 172 is external to valve body 110. The actuating member 179 is coupled to the second end of the actuating shaft 172 via a fastener or other attachment mechanism such that the valve actuating assembly 170 can be actuated to open and close the valve 100.

More specifically and as best shown in FIG. 1, the poppet 150 and seat disc 152 are held in the closed position, via the spring 160, such that the seat disc 152 and valve seat 113 form a fluid-tight seal. When the valve 100 is in the closed position, actuation of the actuating member 179 causes a corresponding rotation of the actuating shaft 172 and cam 176 such that the cam 176 engages the actuating assembly engagement member 144 of the lower valve stem 140a and causes a subsequent upward movement of the lower valve stem 140a and poppet 150. As the actuating member 179 continues to rotate towards the open position, engagement between the cam 176 and the actuating assembly engagement member 144 generates a force greater than the biasing force of the spring 160. As such, rotation of the actuating member 179 from the closed position to the open position causes the poppet 150 and seat disc 152 to disengage from the valve seat 113. Conversely, rotation of the actuating member 179 from the open position to the closed position causes the biasing force generated by the spring 160 to act on the poppet 150 and lower valve stem 140a to close the valve 100 and form the fluid-tight seal between seat disc 152 and valve seat 113.

Figure 3:
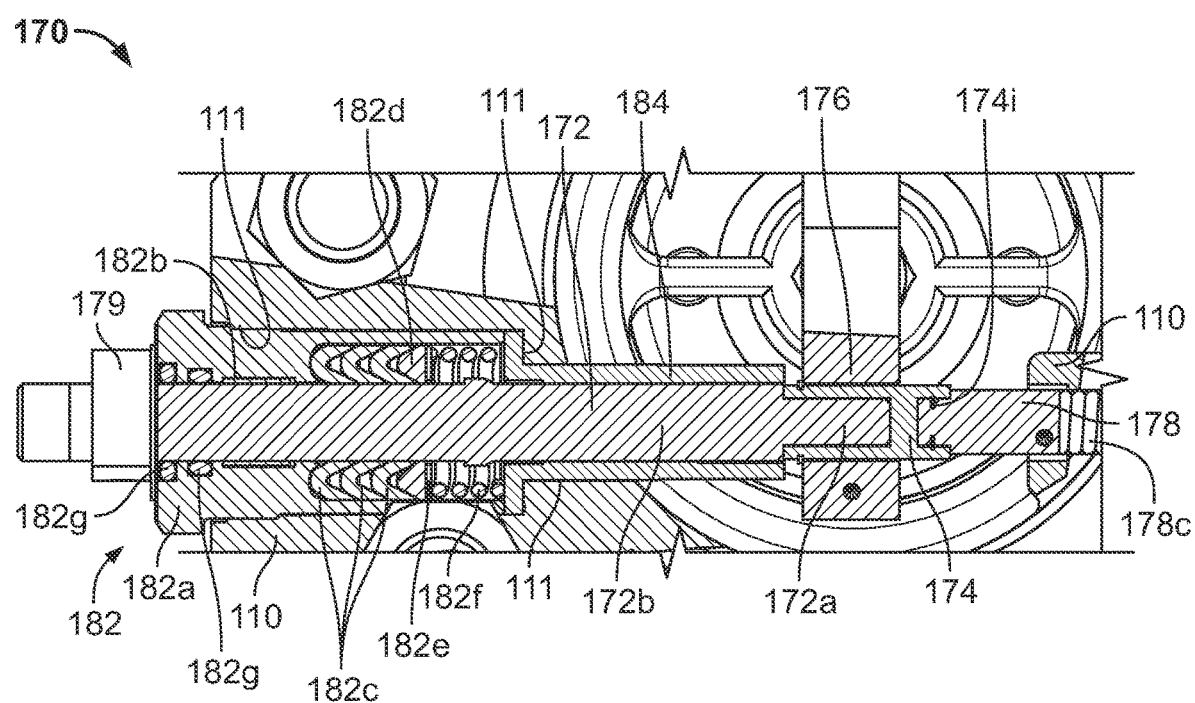
FIG. 3 is a cross-sectional partial bottom view of the valve actuating assembly and an exemplary valve packing assembly of the internal valve of FIG. 1, in accordance with a first embodiment.

In the illustrated example, valve actuating assembly 170 includes a valve packing assembly 182 configured to form a fluid-tight seal around valve actuating shaft 172 and other components of the valve actuating assembly 170. As best shown in FIG. 3, the plurality of inner surfaces 111 of the valve body 110 also define a valve packing bore (not labeled) that receives the valve packing assembly 182 and a shaft bearing 184 of valve actuating assembly 170. The actuating shaft 172 is rotatably supported by valve packing assembly 182 and shaft bearing 184 such that the actuating shaft 172 can rotate relative to valve body 110 upon activation of valve actuating assembly 170 to actuate the valve 100 between the closed and open positions.

In the illustrated embodiment, the valve packing assembly 182 includes a packing housing 182a, a packing bearing 182b, a plurality of packing seals or rings 182c, a jam ring 182d, a retaining member 182e, a biasing member or spring 182f, and one or more o-rings 182g. The packing housing 182a includes external threads (not shown) that threadably engage internal threads (not shown) of the valve packing bore to removably couple valve packing assembly 182 to valve body 110. In the illustrated embodiment, the packing housing 182a includes a plurality of inner surfaces (not labeled) that define an interior packing bore and void (not labeled) of the packing housing 182a. The packing bearing 182b, packing seals 182c, jam ring 182d, retaining member 182e, biasing member 182f, and o-rings 182g are disposed within the interior packing bore and void. Furthermore, at least a portion of the actuating shaft 172 extends through the packing bore and void of the packing housing 182a such that the packing bearing 182b, packing seals 182c, jam ring 182d, retaining member 182e, biasing member 182f, and o-rings 182g circumferentially surround the actuating shaft 172.

In the illustrated embodiment, the packing bearing 182b and shaft bearing 184 are each configured to enable rotation of the actuating shaft 172 relative to the packing housing 182a and valve body 110. The packing seals 182c and jam ring 182d sealingly engage the actuating shaft 172 and inner surfaces of the packing housing 182a. In the illustrated embodiment, the retaining member 182e and biasing member 182f are disposed between the jam ring 182d and the shaft bearing 184 such that the biasing member 182f is compressed between the retaining member 182e and a flange portion (not labeled) of the shaft bearing 184. As such, the retaining member 182e exerts a biasing force generated by the biasing member 182f onto the jam ring 182d and packing seals 182c to maintain a fluid-tight seal of the valve packing assembly 182.

Figure 4A:
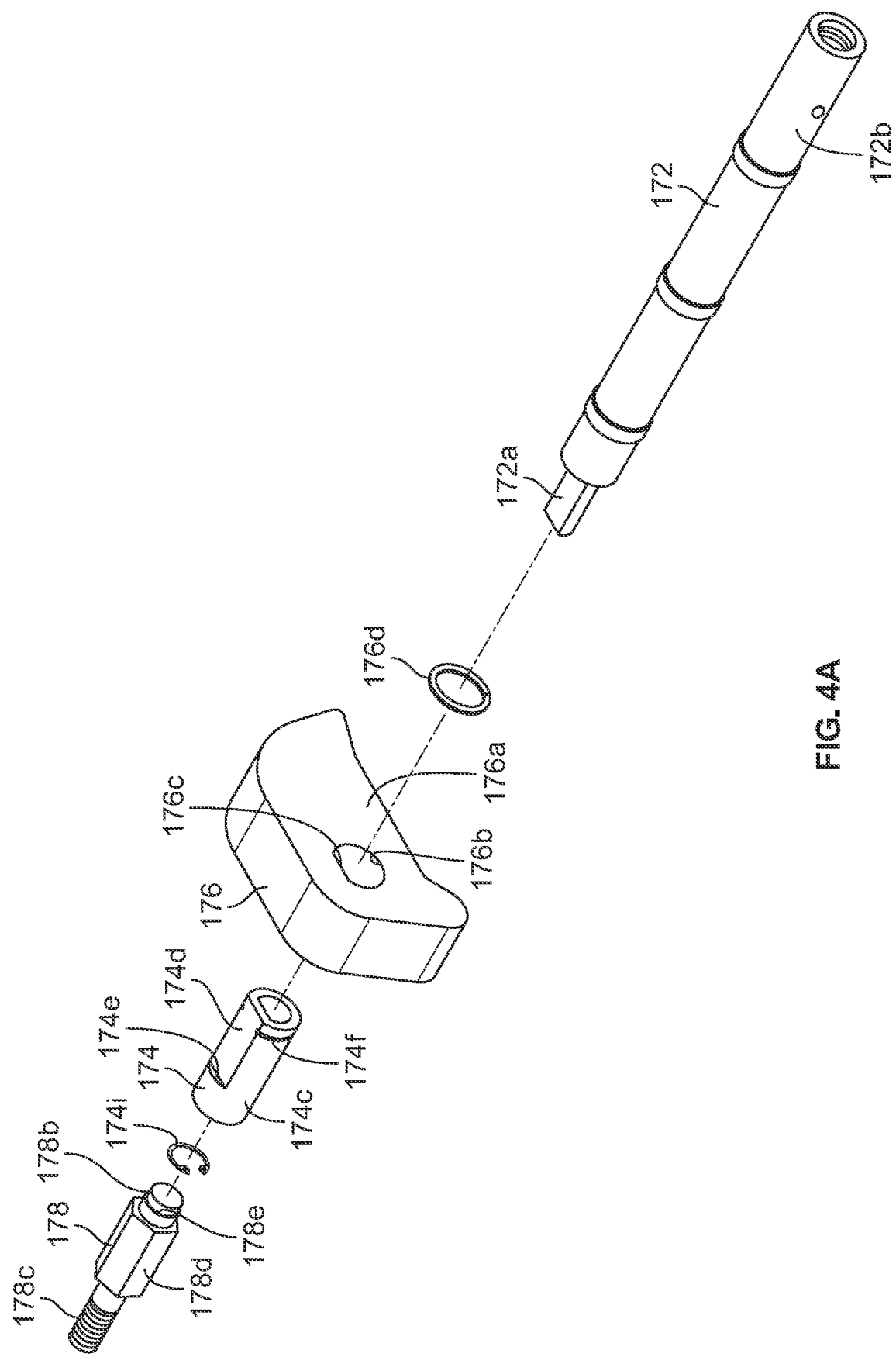
FIG. 4A is an exploded elevated perspective view of the valve actuating assembly of FIG. 3.
Figure 4B:
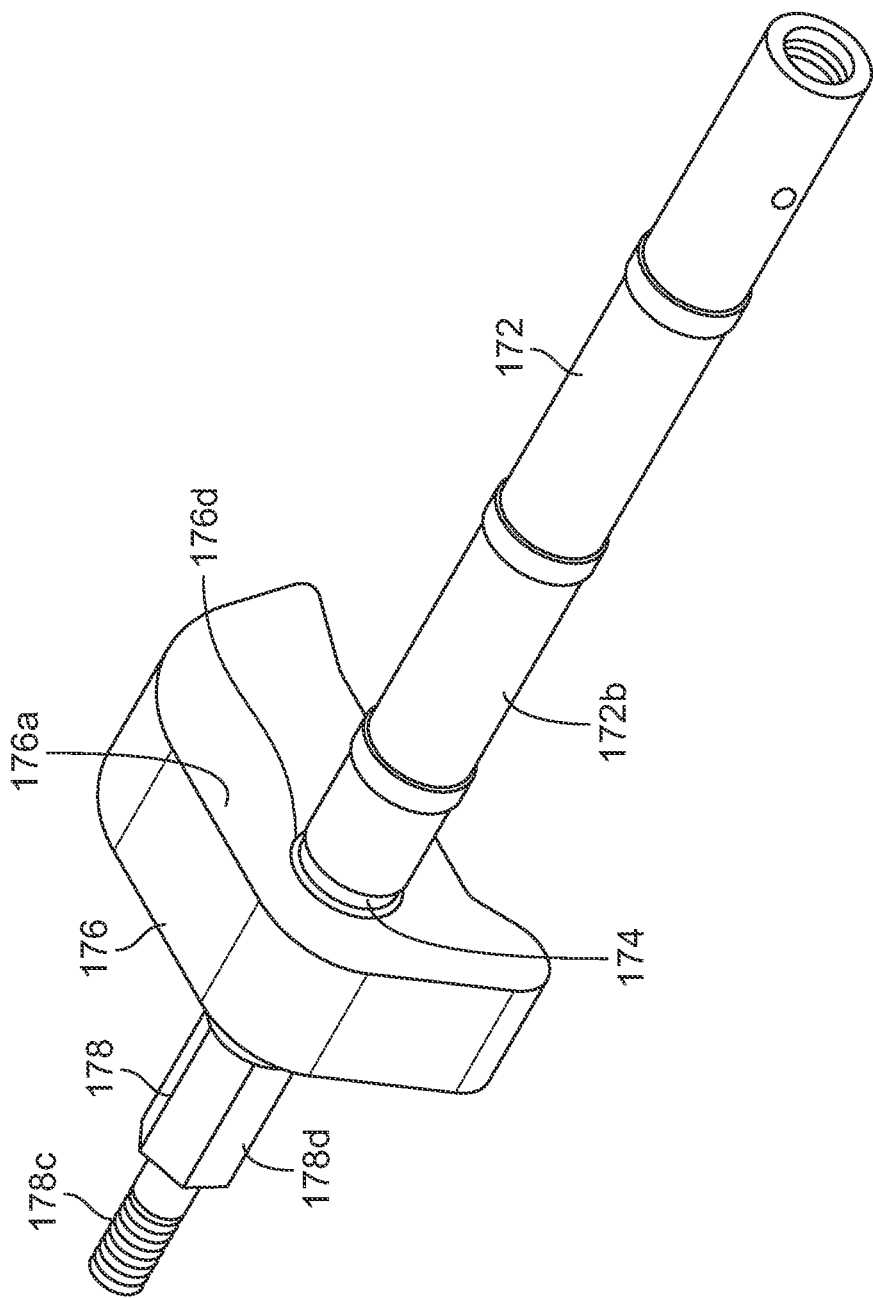
FIG. 4B is an elevated perspective view of the valve actuating assembly of FIG. 3.
Figure 5:
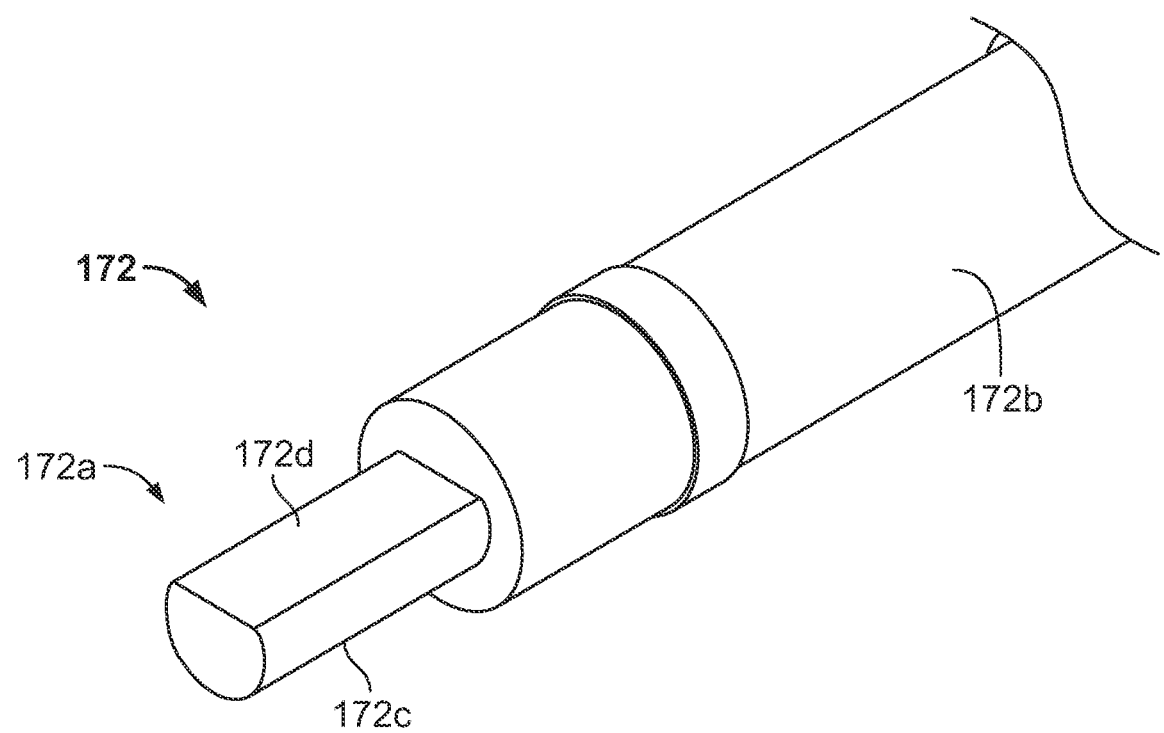
FIG. 5 is a partial elevated perspective view of an exemplary actuating shaft of the valve actuating assembly of FIGS. 4A and 4B.

As best shown in FIGS. 3, 4A, 4B, and 5, the actuating shaft 172 includes a cam holder connection portion 172a at the first end of the actuating shaft 172 and a cylindrical shaft portion 172b extending between the cam holder connection portion 172a and the second end of the actuating shaft 172. The cam holder connection portion 172a extends a specified length and axially away from the cylindrical shaft portion 172b such that the cam holder connection portion 172a forms an interference fit or other such tight connection with an actuating shaft receiving bore defined in the cam holder 174. As best shown in FIG. 5, the cam holder connection portion 172a includes a cylindrical outer surface portion 172c and a flat outer surface portion 172d that form or otherwise define a non-cylindrical or non-circular shape of the cam holder connection portion 172a. For example, the cam holder connection portion 172a forms a structure that looks like a cylinder with a portion cut off along a length of the cam holder connection portion 172a such that the flat outer surface portion 172d defines a flat rectangular surface and the cylindrical outer surface portion 172c defines an arcuate or curved surface. In the illustrated embodiment, the cylindrical shaft portion 172b defines a substantially cylindrical shape (e.g., within manufacturing tolerances) of the actuating shaft 172. The cylindrical shaft portion 172b also includes a diameter (not labeled) that is larger than a height, diameter or other such dimension of the cam holder connection portion 172a.

As shown in FIG. 4A, the cam holder connection portion 172a is sized, shaped and otherwise configured to operably couple actuating shaft 172 to the cam holder 174. In the illustrated embodiment, cam holder 174 includes a plurality of inner surfaces that define an actuating shaft receiving bore (not labeled) in a first end thereof and a stem receiving bore (not labeled) defined in a second end thereof. More specifically, as best shown in FIGS. 6A and 6C, cam holder 174 includes a cylindrical inner surface portion 174a and flat inner surface portion 174b that define the actuating shaft receiving bore extending through at least a portion of the first end of cam holder 174. In the illustrated embodiment, the cylindrical inner surface portion 174a and flat inner surface portion 174b of cam holder 174 respectively correspond to the cylindrical outer surface portion 172c and flat outer surface portion 172d of cam holder connection portion 172a of the actuating shaft 172. As such, the cam holder connection portion 172a can be inserted into the actuating shaft receiving bore of cam holder 174 to couple or otherwise connect the actuating shaft 172 to the cam holder 174 to enable cam holder 174 to rotate along with actuating shaft 172. Other shapes of the components may be used for this purpose, for example, as shown in FIGS. 10-15 and described herein, and as shown in FIGS. 16A through 17B and described herein.

In the illustrated embodiment, cam holder 174 also includes a cylindrical outer surface portion 174c and a flat outer surface portion 174d that form or otherwise define a non-cylindrical or non-circular shape of at least a portion of the cam holder 174. For example, cam holder 174 forms a structure that looks like a cylinder with a portion cut off along a portion of a length (li) of the cam holder 174 such that the flat outer surface portion 174d defines a rectangular surface and the cylindrical outer surface portion 174c defines an arcuate or curved surface. In the illustrated embodiment, the cylindrical outer surface portion 174c and flat outer surface portion 174d also form or otherwise define a shoulder 174e that extends radially upward a height (h) from the flat outer surface portion 174d. The shoulder 174e is formed or otherwise positioned the length (li) from the first end of cam holder 174.

In the illustrated embodiment, the cylindrical outer surface 174c further defines a retaining ring groove 174f circumferentially defined in the cylindrical outer surface 174c and positioned a length (12) from the first end of cam holder 174. In the illustrated embodiment, the length (li) is larger or greater than length (12) such that the shoulder 174e is positioned a distance (e.g., li —12) away from the retaining ring groove 174f.

As best shown in FIGS. 4A and 4B, cam holder 174 is sized and shaped to correspond to a cam bore (not labeled) defined in the cam 176 such that cam 176 is mounted on or otherwise supported by cam holder 174. In the illustrated embodiment, the cam 176 includes a cam body 176a, a cylindrical inner surface 176b, and a flat inner surface 176c that defines the cam bore extending through the cam body 176a. In the illustrated embodiment, the shape and size of the cam bore corresponds to the size and shape of the previously described cylindrical outer surface portion 174c and flat outer surface portion 174d of cam holder 174 such that insertion of the first end of cam holder 174 into the cam bore mounts cam 176 onto cam holder 174. When cam 176 is mounted onto cam holder 174, at least a portion of cam body 176a engages with shoulder 174e to mount or otherwise position the cam 176 on cam holder 174.

As described herein, the cylindrical outer surface 174c and flat outer surface portion 174d of cam holder 174 forms or otherwise defines the shoulder 174e at a distance equal to the length (li) from the first end of cam holder 174. In the illustrated embodiment, length (li) of cam holder 174 is configured such that at least a portion of the first end of cam holder 174 extends axially exterior to the cam body 176a. For example, cam holder 174 extends through the bore of cam 176 at least the length (12) such that the retaining ring groove 174f of cam holder 174 is positioned exterior to and adjacent the first side of cam body 176a.

In the illustrated embodiment, valve actuating assembly 170 includes a retaining ring 176d that corresponds with the retaining ring groove 174f of cam holder 174. Once the cam 176 is mounted onto the cam holder 174, insertion of retaining ring 176d into retaining ring groove 174f operatively engages or holds cam 176 to cam holder 174. More specifically, cam holder 174 is aligned with and inserted through the cam bore of cam 176. The cam 176 is positioned on cam holder 174 such that at least a portion of cam body 176a engages shoulder 174e of cam holder 174 and a portion of cam holder 174 extends outward from the cam bore such that the retaining ring 176d can be inserted into the retaining ring groove 174f to hold or otherwise position the cam 176 on cam holder 174. As such, when cam 176 is mounted onto cam holder 174, cam 176 is positioned and held between the shoulder 174e and the retaining ring 176d to prevent cam 176 from sliding out of position when shaft 172 is removed from cam holder 174 or during other such valve maintenance procedures.

As best shown in FIGS. 6A and 6B, cam holder 174 also includes a cylindrical inner surface portion 174g that defines the stem receiving bore extending through at least a portion of the second end of cam holder 174. In the illustrated embodiment, the stem receiving bore defined by the cylindrical inner surface portion 174g forms a substantially cylindrical void (e.g., within manufacturing tolerances) within the second end of cam holder 174. The cylindrical inner surface portion 174g also defines a locking ring groove 174h around a circumference of the stem receiving bore. The locking ring groove 174h is configured to receive a locking ring or snap ring 174i that operably couples cam holder 174 to cam holder stem 178.

Figure 7:
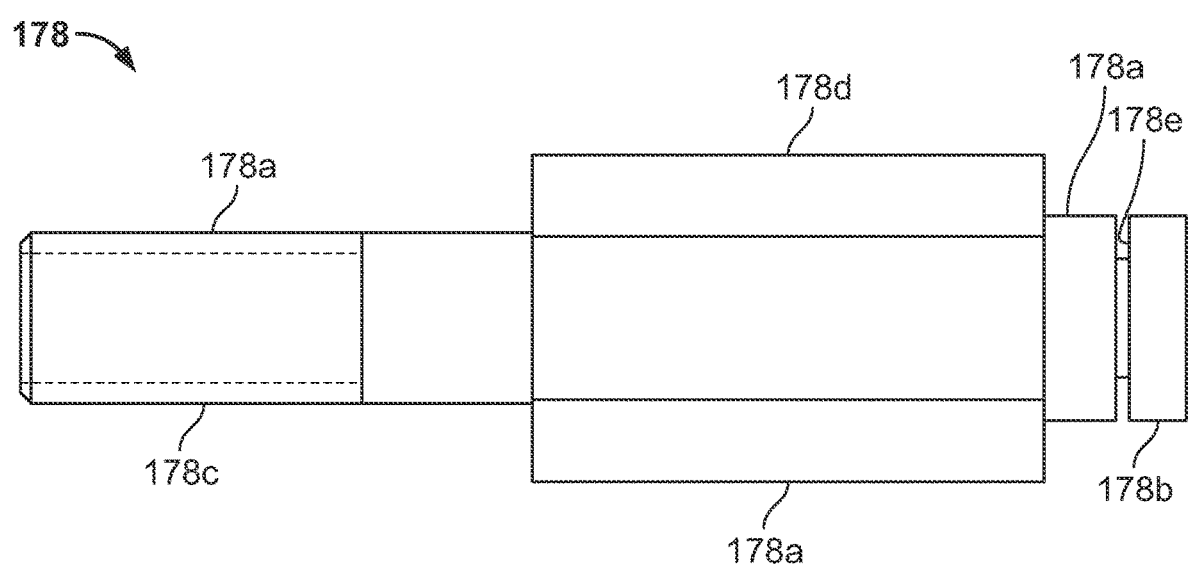
FIG. 7 is a side view of an exemplary cam stem holder of the valve actuating assembly of FIGS. 4A and 4B.
Figure 8A:
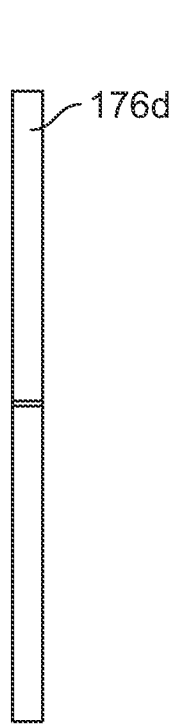
FIGS. 8A and 8B are respective side and front views of an exemplary retaining ring of the valve actuating assembly of FIGS. 4A and 4B.
Figure 8B:
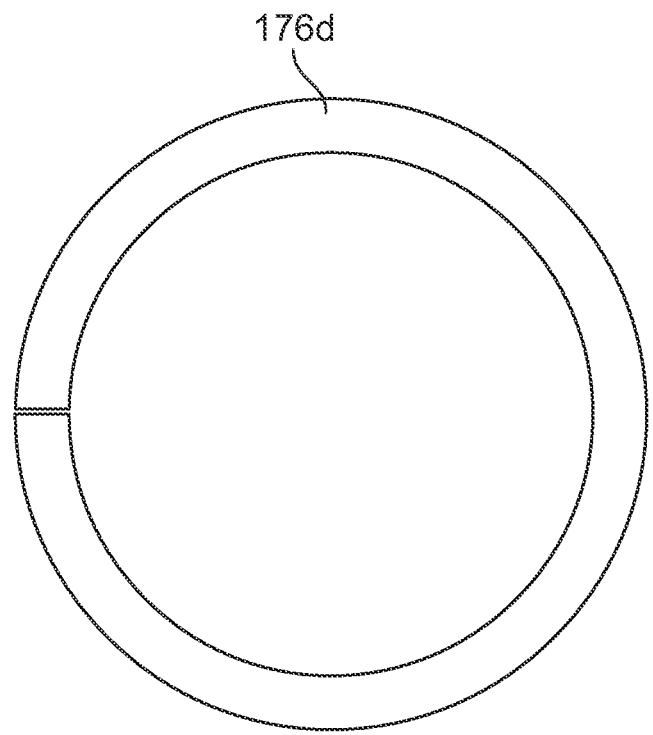
Figure 9A:
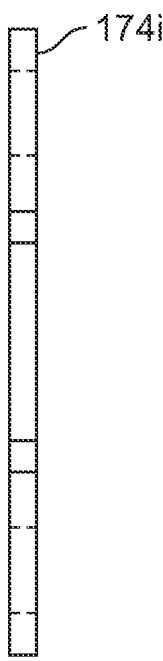
FIGS. 9A and 9B are respective side and front views of an exemplary locking ring of the valve actuating assembly of FIGS. 4A and 4B.
Figure 9B:
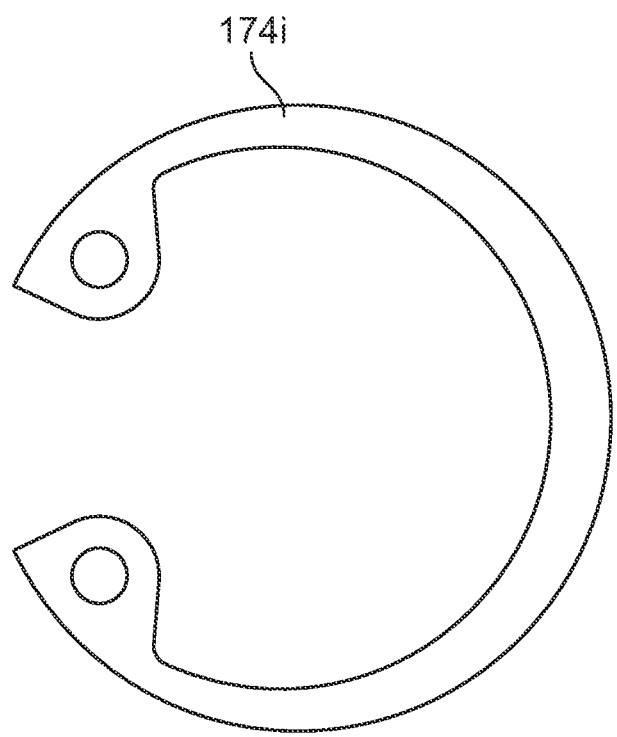

As best shown in FIGS. 4A, 4B, and 7, the cam holder stem 178 includes a plurality of outer surfaces 178a that define a cam holder engagement portion 178b at a first end of the cam holder stem 178, a threaded outer surface portion 178c at a second end of the cam holder stem 178, and a tool engagement portion 178d disposed between the first and second ends of the cam holder stem 178. In the illustrated embodiment, cam holder engagement portion 178b is configured as a cylindrical structure that extends axially away from the tool engagement portion 178d. The cam holder engagement portion 178b is shaped, sized, and otherwise configured to extend into the stem receiving bore defined by the cylindrical inner surface portion 174g of cam holder 174. More specifically, the stem receiving bore of cam holder 174 has a first diameter (not labeled) and the cam holder engagement portion 178b of cam holder stem 178 has a second diameter (not labeled) that is slightly smaller than the first diameter of the stem receiving bore. As such, the cam holder engagement portion 178b extends into the stem receiving bore to couple cam holder stem 178 to cam holder 174.

In the illustrated embodiment, the plurality of outer surfaces 178a define a locking ring groove 178e in the cam holder engagement portion 178b. Similar to the locking ring groove 174h of cam holder 174, the locking ring groove 178e of the cam holder stem 178 is configured to receive the locking ring 174i to operatively couple or otherwise attached cam holder stem 178 to cam holder 174. For example, the locking ring 174i may be inserted into the locking ring groove 178e defined in the cam holder engagement portion 178b such that at least a portion of the locking ring 174i extends radially outward from the outer surface 178a of the cam holder engagement portion 178b. The stem receiving bore of cam holder 174 is configured to receive the cam holder engagement portion 178b with locking ring 174i positioned in locking ring groove 178e. The cam holder engagement portion 178b is inserted into the stem receiving bore until the locking ring 174i is received in the locking ring groove 174h of cam holder 174. As such, the locking ring 174i operatively couples cam holder stem 178 to cam holder 174. It will be understood that while locking ring 174i is shown to couple the cam holder stem 178 and cam holder 174, other fastening methods and devices, such as threads, an interference fit, epoxy, and the like can be used, for example, as shown in FIGS. 10-15 and described herein.

As best shown in FIGS. 3, 4A, and 4B, the threaded outer surface portion 178c at the second end of the cam holder stem 178 is threaded into valve body 110 to fixedly couple or attach cam holder stem 178 to valve body 110. In the illustrated embodiment, the tool engagement portion 178d of cam holder stem is configured as a hexagonal structure such that a wrench or other such tool can be used to thread or otherwise fixedly couple cam holder stem 178 to valve body 110.

As discussed herein, the valve actuating assembly 170 of valve 100 includes the actuating shaft 172, cam holder 174, cam 176, cam holder stem 178, and actuating member 179. More specifically, valve actuating assembly 170 is configured such that actuating shaft 172 can be disconnected from valve actuating assembly 170 and removed from valve body 110 while other components such as cam holder 174, cam 176, and cam holder stem 178 remain in place within valve body 110. Such a configuration of the valve actuating assembly can be helpful in certain valve designs where there is not enough space in the bonnet or valve body to enable removal of both the cam and the actuating shaft. As such, enabling removal of the actuating shaft 172, while maintaining the cam 176 and other actuating assembly components in place within the valve body 110, provides access to the valve packing assembly 182 in order to perform maintenance and/or replacement of certain valve packing assembly components (e.g., packing bearing, packing seals, jam ring, retaining member, biasing member, and o-rings).

In summary, a first connection of the valve actuating assembly components is formed by removably coupling the actuating shaft 172 to the cam holder 174 via an interference fit or other such removable connection between the cam holder connection portion 172a of actuating shaft 172 and the actuating shaft receiving bore of cam holder 174. The non-cylindrical or non-circular shape of the cam holder connection portion 172a and the actuating shaft receiving bore enables cam holder 174 to correspondingly rotate with actuating shaft 172.

In addition, a second connection of the valve actuating assembly components is formed between the cam holder stem 178 and cam holder 174. More specifically, one end of the cam holder stem 178 is attached to the cam holder 174 via the locking ring 174i. The cam holder stem 178 includes locking ring groove 178e configured to receive the locking ring 174i. The locking ring 174i and a portion of the cam holder stem 178 are inserted into the stem receiving bore of the cam holder 174 such that the locking ring 174i is also received by the locking ring groove 174h of cam holder 174. The connection of cam holder stem 178 and cam holder 174, via locking ring 174i, enables cam holder 174 to rotate freely while the cam holder stem 178 is held stationary and does not rotate. Connection of the cam holder stem 178 to cam holder 174, via the locking ring 174i, also prohibits accidental removal of cam holder 174 from cam holder stem 178. The cam holder stem 178 provides support to cam holder 174 such that actuating shaft 172 can be removed from valve body 110 while cam holder 174 remains in place to hold and position the cam 176 within the valve body 110.

Figure 10:
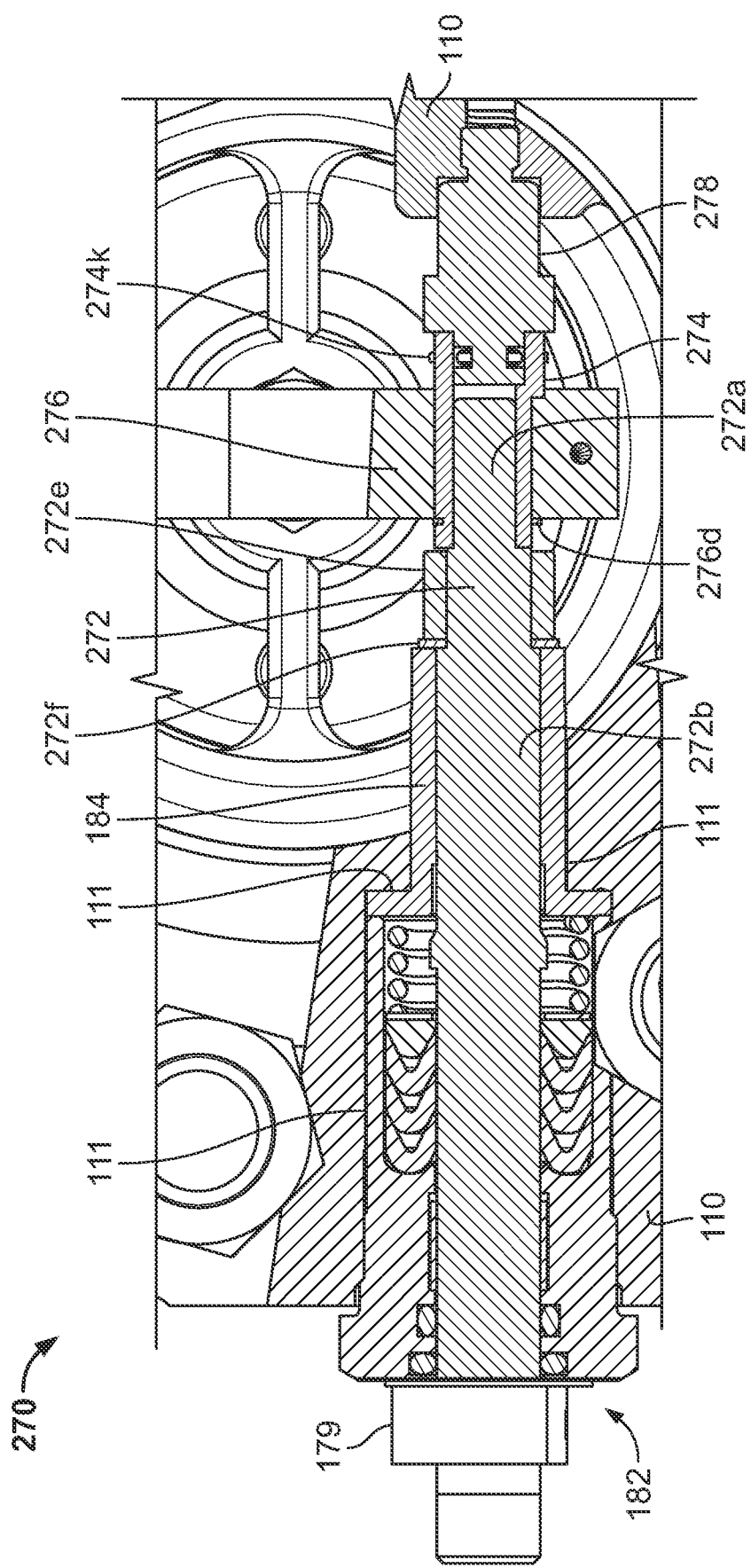
FIG. 10 is a cross-sectional partial bottom view of another exemplary valve actuating assembly and valve packing assembly of the internal valve of FIG. 1 in accordance with a second embodiment.

FIGS. 10-15 illustrate another valve actuating assembly 270 that can be included in the valve 100 of FIG. 1 in place of the valve actuating assembly 170, in accordance with embodiments. The valve actuating assembly 270 may be generally similar to the valve actuating assembly 170, in both operation and overall components and thus, may be coupled to the valve body 110 and/or interact with other components of the valve 100 in a similar manner. For example, as shown in FIG. 10, the valve actuating assembly 270 is coupled to the valve body 110 at one end and includes the actuating member 179 at an opposite end to enable actuation of the valve 100 between open and closed positions, like the valve actuating assembly 170. More specifically, as best shown in FIGS. 10,11A, and 11B, the valve actuating assembly 270 further comprises an actuating shaft 272 with a first end coupled to the actuating member 179, a cam holder 274 coupled to a second end of the actuating shaft 272, a cam 276 mounted to the cam holder 274, and a cam holder stem 278 coupled to the cam holder 274 and the valve body 110. The valve actuating assembly 270 may be configured, like the valve actuating assembly 170, such that rotation of the actuating member 179 from the closed position towards the open position causes a corresponding rotation of the actuating shaft 272 and cam 276, such that the cam 276 engages the actuating assembly engagement member 144 of the lower valve stem 140a and causes a subsequent upward movement of the lower valve stem 140a and poppet 150 until the poppet 150 and the seat disc 152 disengage from the valve seat 113, thus opening the valve 100. The valve actuating assembly 270 may also be configured, like the valve actuating assembly 170, such that the reverse movement, i.e. rotation of the actuating member 179 from the open position to the closed position, causes the valve 100 to close and form the fluid-tight seal between seat disc 152 and valve seat 113.

Also like the valve actuating assembly 170, the valve actuating assembly 270 is configured such that the actuating shaft 272 can be disconnected from the remainder of the valve actuation assembly 270 and removed from the valve body 110 while other components, such as the cam holder 274, cam 276, and cam holder stem 278, remain in place within the valve body 110. This configuration, like that of the valve actuating assembly 170, can be helpful at least because, as shown in FIG. 10, the valve packing assembly 182 surrounds the actuating shaft 272 such that the valve packing assembly components cannot be serviced while the actuating shaft 272 is in place.

Moreover, there may not be enough space in the bonnet 120 or the valve body 110 to enable removal of the cam 276 along with the actuating shaft 272. Thus, enabling removal of the actuating shaft 272 from the valve body 110, while keeping the cam 276 and other actuating assembly components in place within the valve body 110, provides access to the valve packing assembly 182 for servicing, maintenance, and/or replacement of certain valve packing assembly components (e.g., packing bearing, packing seals, jam ring, retaining member, biasing member, and o-rings), similar to the valve actuating assembly 170.

Given the similarities between the two valve actuating assemblies 170 and 270, the common components of the valve 100 will not be described in great detail in the following paragraphs for the sake of brevity. Instead, reference is made to FIGS. 1 and 2 and the preceding paragraphs associated therewith for a detailed description of such common components. Reference is also made to FIG. 3 and associated paragraphs for a detailed description of the valve packing assembly 182 (including the various components included therein) and the shaft bearing 184, which are coupled to or around the valve actuating assembly 270 in the same manner as the valve actuating assembly 170 shown in FIG. 3.

The components of the valve actuating assembly 270 will be described in greater detail. As best shown in FIGS. 10, 11A, 11B, and 12, the actuating shaft 272 of the valve actuating assembly 270 includes a cam holder connection portion 272a at the second end of the actuating shaft 272 and a cylindrical shaft portion 272b extending between the cam holder connection portion 272a and the first end of the actuating shaft 272. The cam holder connection portion 272a extends a specified length and axially away from the cylindrical shaft portion 272b such that the cam holder connection portion 272a forms an interference fit or other such tight connection with an actuating shaft receiving bore defined in the cam holder 274. As best shown in FIG. 12, the cam holder connection portion 272a is comprised of four generally flat surfaces configured to form or define a substantially square-shaped cross-section (which differs from the "D-shaped" cross-section of the cam holder connection portion 172a shown in FIG. 5). As also shown, the cylindrical shaft portion 272b defines a substantially cylindrical shape (e.g., within manufacturing tolerances) of the actuating shaft 272. The cylindrical shaft portion 272b also includes a diameter (not labeled) that is larger than a height, diameter, or other such dimension of the cam holder connection portion 272a.

Figure 11A:
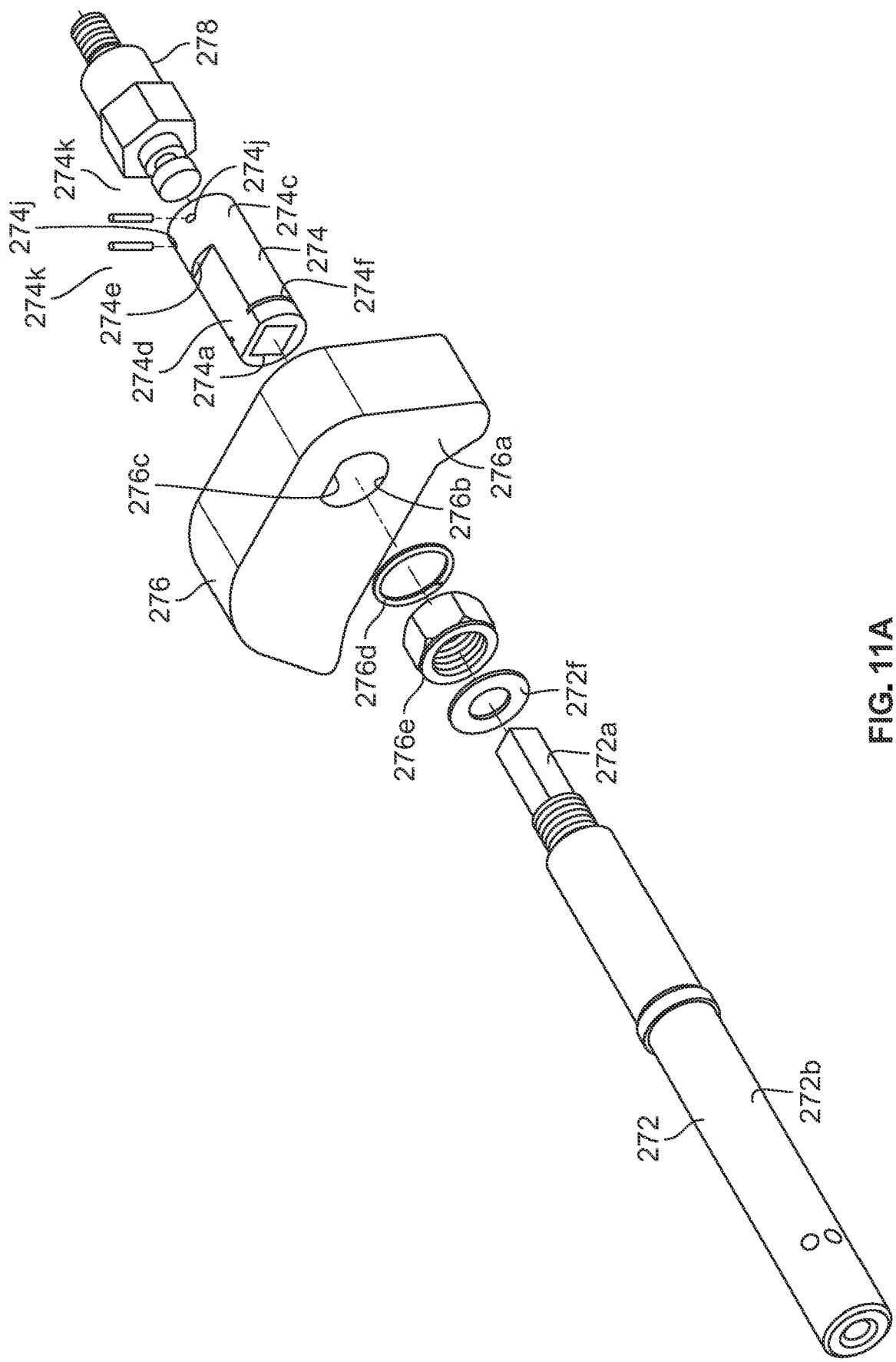
FIG. 11A is an exploded elevated perspective view of the valve actuating assembly of FIG. 10.
Figure 12:
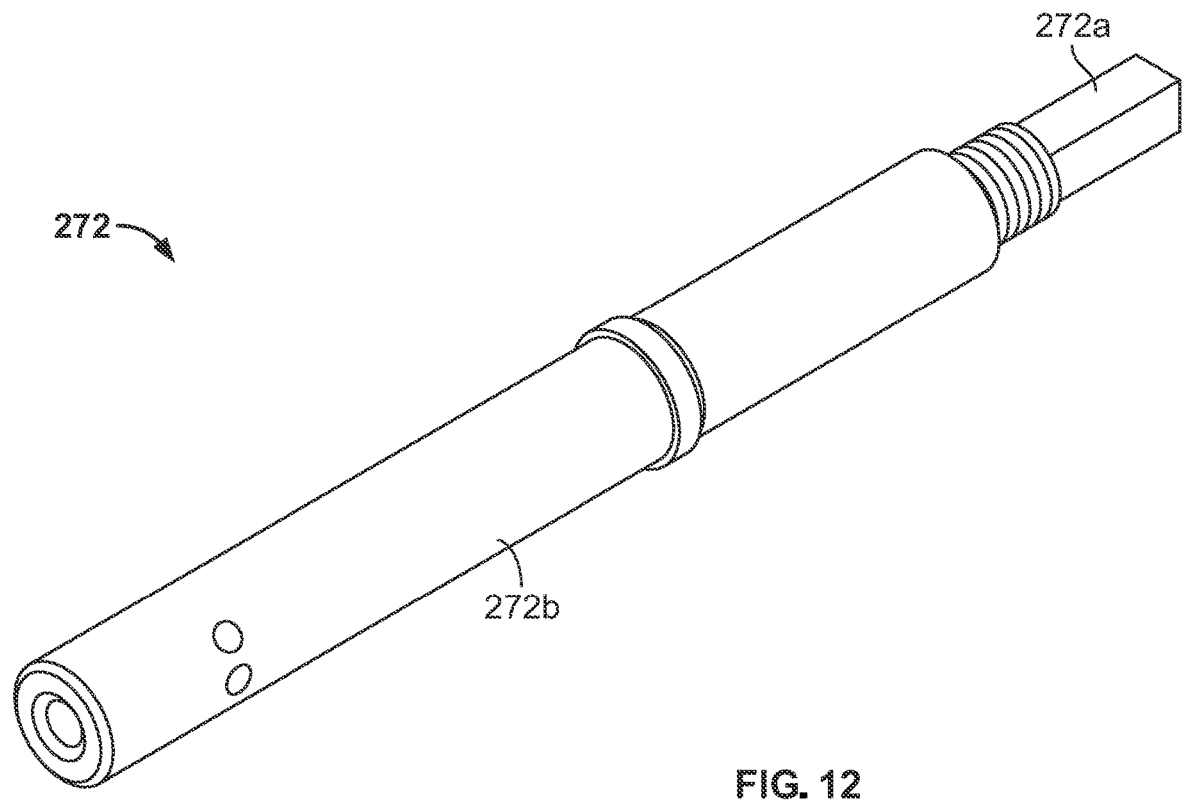
FIG. 12 is a partial elevated perspective view of an exemplary actuating shaft of the valve actuating assembly of FIGS. 11A and 11B.
Figure 16A:
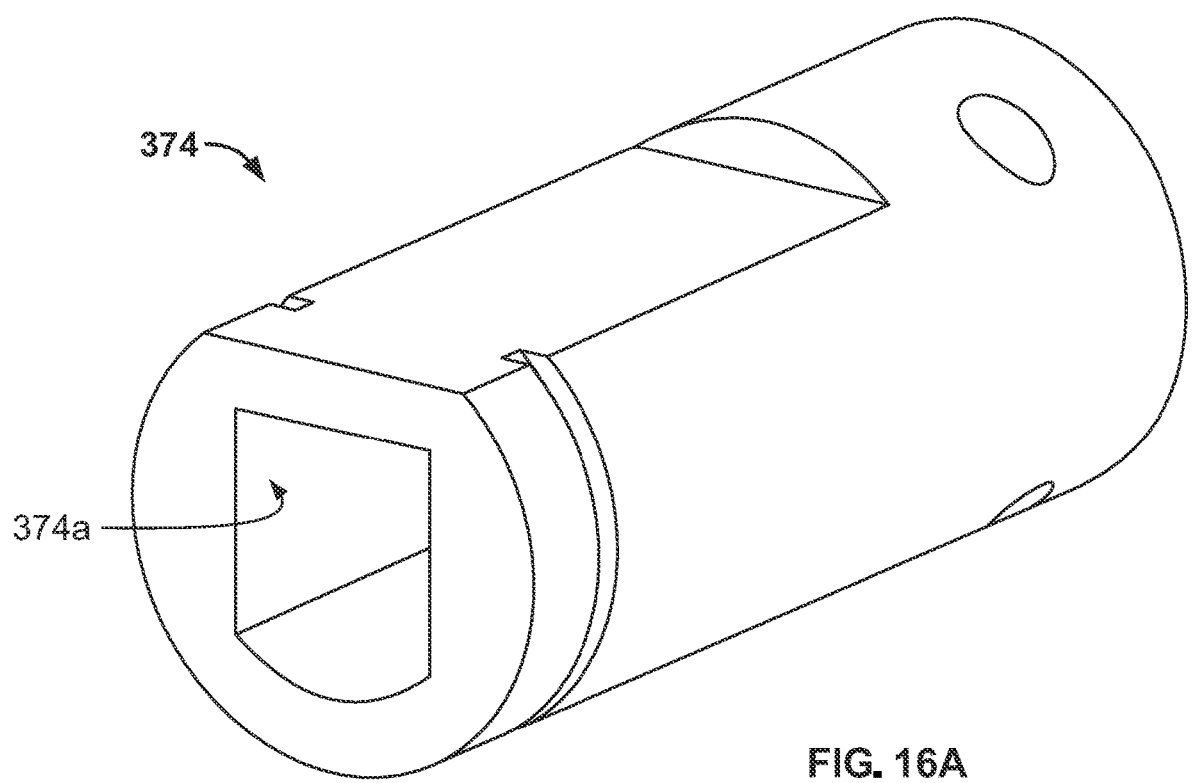
FIG. 16A is a top perspective view of another exemplary cam holder for placement in the valve actuating assembly of FIG. 10, in accordance with some embodiments.
Figure 16B:
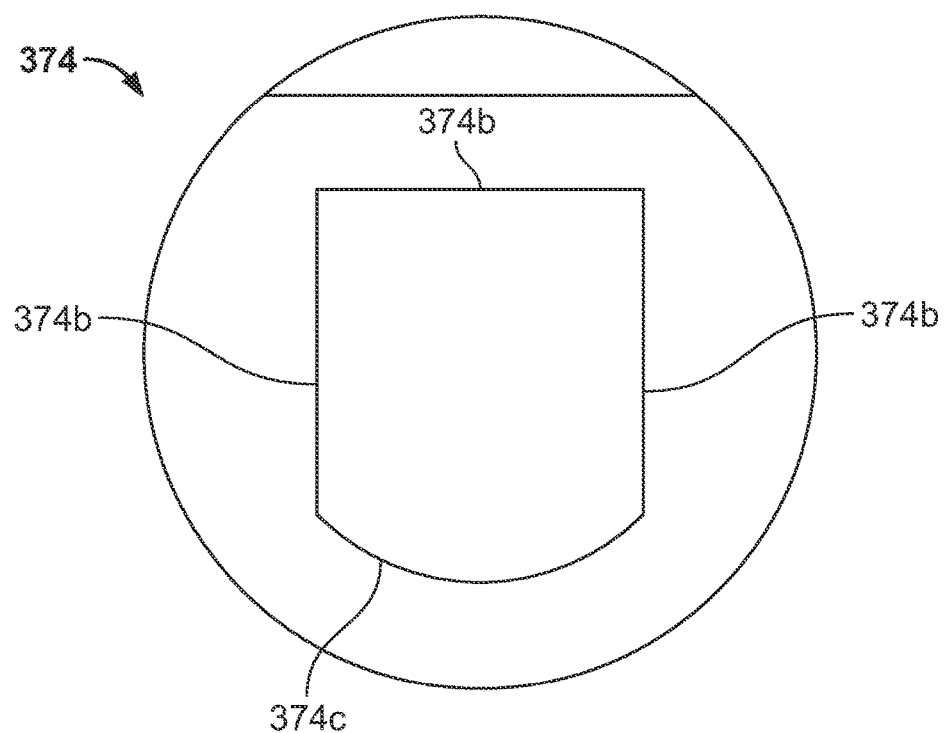
FIG. 16B is an end view of the cam holder of FIG. 16A.
Figure 17A:
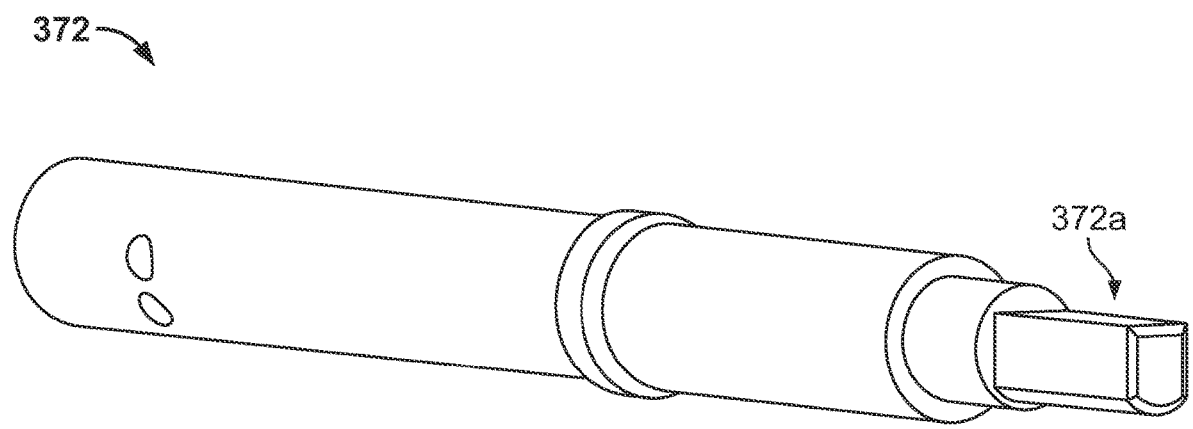
FIG. 17A is a side perspective view of another exemplary actuating shaft for placement in the valve actuating assembly of FIG. 10, in accordance with some embodiments.
Figure 17B:
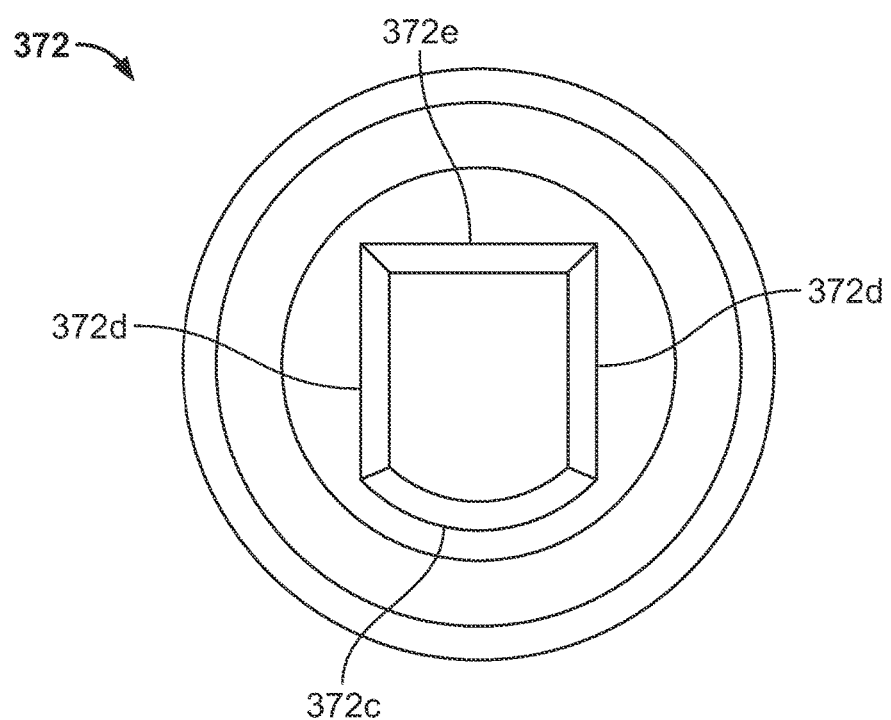
FIG. 17B is an end view of the actuating shaft of FIG. 17A.

As shown in FIG. 11A, the cam holder connection portion 272a is sized, shaped and otherwise configured to operably couple actuating shaft 272 to the cam holder 274. In the illustrated embodiment, cam holder 274 includes a plurality of inner surfaces that define an actuating shaft receiving bore (not labeled) in a first end thereof and a stem receiving bore (not labeled) defined in a second end thereof. More specifically, as best shown in FIGS. 13A and 13C, cam holder 274 includes a plurality of inner surfaces 274a that define the actuating shaft receiving bore extending through at least a portion of the first end of cam holder 274. In the illustrated embodiment, the bore formed by the inner surfaces 274a of cam holder 274 has a square shape that corresponds to the square-shaped cam holder connection portion 272a of the actuating shaft 272. In other embodiments, the inner surfaces 274a may be configured to form an actuating shaft receiving bore with a different non-circular cross-section or shape (e.g., hexagonal, triangular, oblong, etc.), for example, as shown in FIGS. 16A and 16B, depending on a non-circular shape of the cam holder connection portion 272a of the actuating shaft 272, for example, as shown in FIGS. 17A and 17B. In either case, the cam holder connection portion 272a can be inserted into the actuating shaft receiving bore of cam holder 274 to couple or otherwise connect the actuating shaft 272 to the cam holder 274 to enable cam holder 274 to rotate along with actuating shaft 272.

In the illustrated embodiment, the valve actuating assembly 270 further includes a first connector 272e (e.g., a nut or the like) and a second connector 272f (e.g., a washer or the like) for securing the valve packing assembly 182 and shaft bearing 184 together with the actuating shaft 272 as a separate subassembly. This subassembly may be secured or held together before connecting the actuating shaft 272 to the cam holder 274 by sliding the non-circular cam holder connection portion 272a of the actuating shaft 272 into the corresponding non-circular actuating shaft receiving bore of the cam holder 274.

Figure 13:
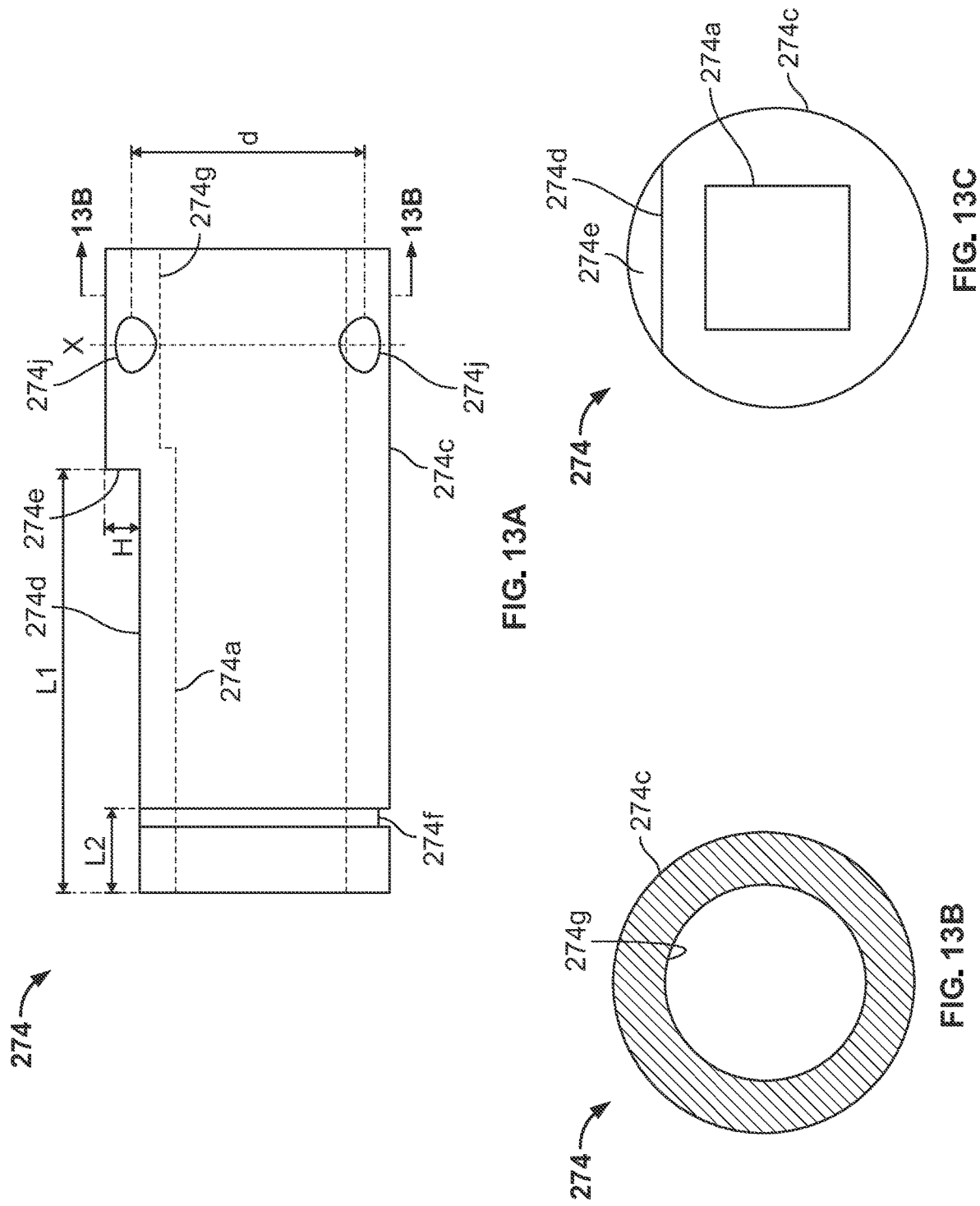
FIG. 13A is a side view of an exemplary cam holder of the valve actuating assembly of FIGS. 11A and 11B.
FIG. 13B is a cross-sectional end view of one end of the cam holder of FIG. 13A.
FIG. 13C is an end view of another end of the cam holder of FIG. 13A.

In the illustrated embodiment, and as seen most clearly in, e.g., FIGS. 11A and 13, cam holder 274 also includes a cylindrical outer surface 274c and a flat outer surface portion 274d that form or otherwise define a non-cylindrical or non-circular shape (e.g., D-shaped) of at least a portion of the cam holder 274. For example, cam holder 274 forms a structure that looks like a cylinder with a portion cut off along a portion of a length (L1) of the cam holder 274 such that the flat outer surface portion 274d defines a rectangular surface and the corresponding portion of cylindrical outer surface 274c defines an arcuate or curved surface. In the illustrated embodiment, flat outer surface portion 274d and the corresponding portion of cylindrical outer surface 274c also form or otherwise define a shoulder 274e that extends a height (H) away from the flat outer surface portion 274d. The shoulder 274e is formed or otherwise positioned the length (L1) from the first end of cam holder 274.

In the illustrated embodiment, a retaining ring groove 274f is circumferentially defined in cylindrical outer surface 274c and positioned a length (L2) from the first end of cam holder 274. In the illustrated embodiment, the length (L1) is larger or greater than length (L2) such that the shoulder 274e is positioned a distance (e.g., L1-L2) away from the retaining ring groove 274f.

Figure 11B:
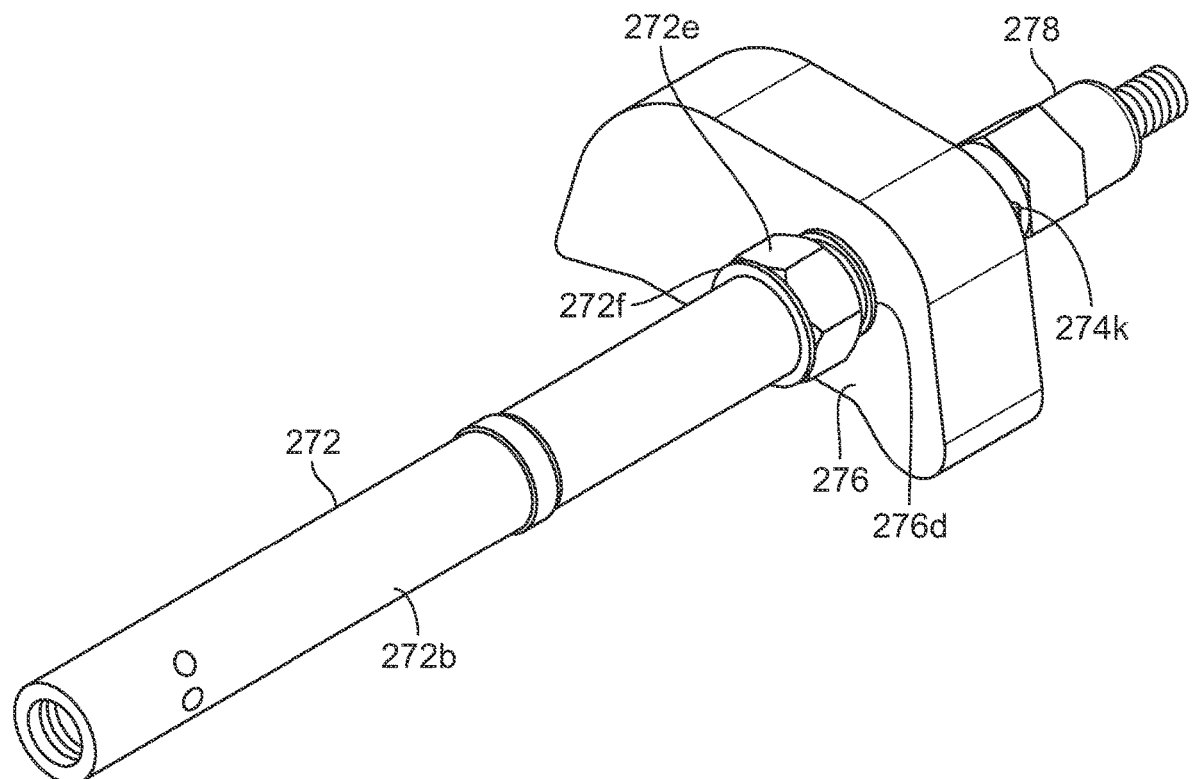
FIG. 11B is an elevated perspective view of the valve actuating assembly of FIG. 10.

As best shown in FIGS. 11A and 11B, a cam bore is defined in cam 276 by a cylindrical inner surface 276b, and a flat inner surface 276c, and cam holder 274 is sized and shaped to correspond to this cam bore such that cam 276 is mounted on or otherwise supported by cam holder 274. In the illustrated embodiment, the shape and size of the cam bore (e.g., non-circular or D-shaped) corresponds to the shape and size of the previously described non-circular portion of cam holder 274 (i.e. the portion formed by flat outer surface portion 274d and the corresponding portion of cylindrical outer surface portion 274c) of, such that insertion of the first end of cam holder 274 into the cam bore mounts cam 276 onto cam holder 274. When cam 276 is mounted onto cam holder 274, at least a portion of cam body 276a engages with shoulder 274e to mount or otherwise position cam 276 on cam holder 274. According to embodiments, cam 276 may be substantially similar to cam 176 shown in FIGS. 3, 4A, and 4B.

As described herein, the cylindrical outer surface 274c and flat outer surface 274d of the cam holder 274 forms or otherwise defines the shoulder 274e at a distance equal to the length (L1) from the first end of cam holder 274. In the illustrated embodiment, length (L1) of cam holder 274 is configured such that at least a portion of the first end of the cam holder 274 extends axially exterior to the cam body 276a. For example, cam holder 274 extends through the bore of cam 276 at least the length (L2) such that the retaining ring groove 274f of cam holder 274 is positioned exterior to and adjacent the first side of cam body 276a.

In the illustrated embodiment, valve actuating assembly 270 includes a retaining ring 276d that corresponds with the retaining ring groove 274f of cam holder 274. Once the cam 276 is mounted onto the cam holder 274, insertion of retaining ring 276d into retaining ring groove 274f operatively engages or holds cam 276 to cam holder 274. More specifically, cam holder 274 is aligned with and inserted through the cam bore of cam 276. The cam 276 is positioned on cam holder 274 such that at least a portion of cam body 276a engages shoulder 274e of cam holder 274 and a distal or opposite portion of cam holder 274 extends outward from the cam bore such that the retaining ring 276d can be inserted into the retaining ring groove 274f to hold or otherwise position the cam 276 on cam holder 274. As such, when cam 276 is mounted onto cam holder 274, cam 276 is positioned and held between the shoulder 274e and the retaining ring 276d to prevent cam 276 from sliding out of position when shaft 272 is removed from cam holder 274 or during other such valve maintenance procedures. According to embodiments, retaining ring 276d may be substantially similar to retaining ring 176d shown in FIGS. 3, 4A, 4B, 8A, and 8B.

As best shown in FIGS. 13A and 13B, the cam holder 274 also includes a cylindrical inner surface portion 274g that defines the stem receiving bore extending through at least a portion of the second end of the cam holder 274. In the illustrated embodiment, the stem receiving bore defined by the cylindrical inner surface portion 274g forms a substantially cylindrical void (e.g., within manufacturing tolerances) within the second end of cam holder 274.

Figure 14:
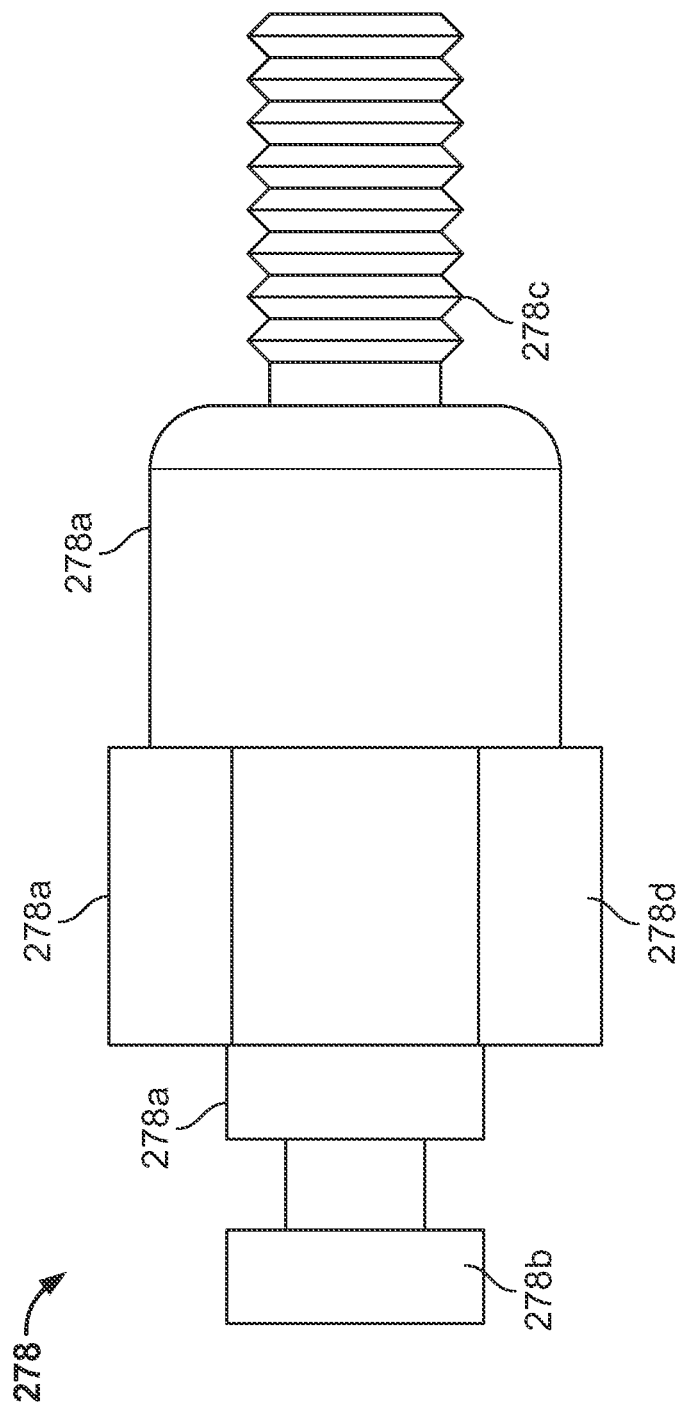
FIG. 14 is a side view of an exemplary cam stem holder of the valve actuating assembly of FIGS. 11A and 11B.
Figure 15:
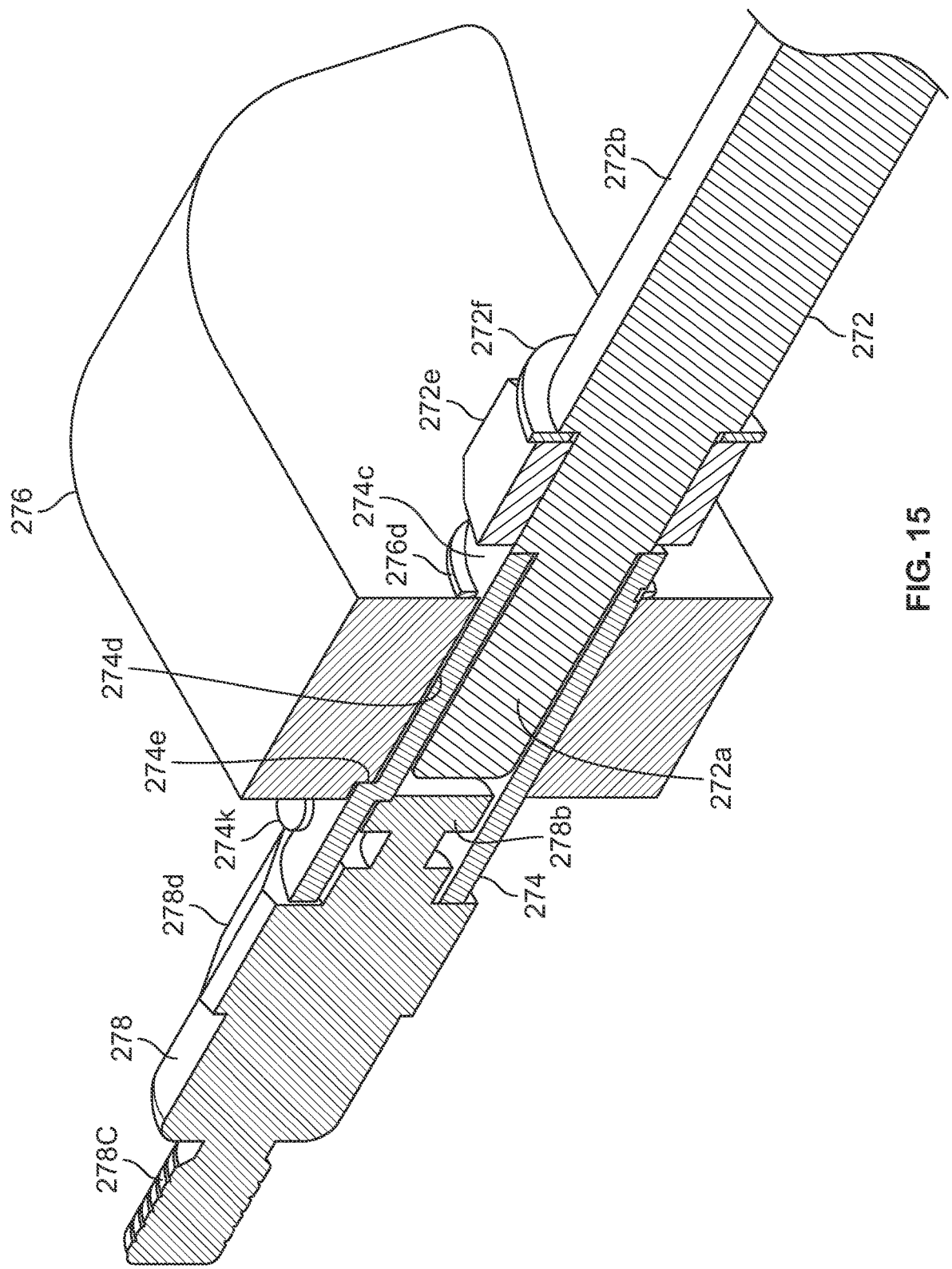
FIG. 15 is a cross-sectional partial elevated perspective view of the valve actuating assembly of FIGS. 11A and 11B

As best shown in FIGS. 11A, 11B, and 14, the cam holder stem 278 includes a plurality of outer surfaces 278a that define a cam holder engagement portion 278b at a first end of the cam holder stem 278, a threaded outer surface portion 278c at a second end of the cam holder stem 278, and a tool engagement portion 278d disposed between the first and second ends of the cam holder stem 278. In the illustrated embodiment, cam holder engagement portion 278b is configured as a cylindrical structure that extends axially away from the tool engagement portion 278d. The cam holder engagement portion 278b is shaped, sized, and otherwise configured to extend into the stem receiving bore defined by the cylindrical inner surface portion 274g of cam holder 274. More specifically, the stem receiving bore of cam holder 274 has a first diameter (not labeled) and the cam holder engagement portion 278b of cam holder stem 278 has a second diameter (not labeled) that is slightly smaller than the first diameter of the stem receiving bore. As such, the cam holder engagement portion 278b extends into the stem receiving bore of the cam holder 274 to couple the cam holder stem 278 to the cam holder 274.

As shown in FIGS. 10, 11A, and 13A, the cam holder 274 further includes a plurality of holes 274j extending through the cylindrical outer surface 274c near the second end of cam holder 274, such that each hole 274j forms a cylindrical bore through the cylindrical portion of the cam holder 274. In the illustrated embodiment, the plurality of holes 274j include at least two holes arranged on either side of the cam holder 274. Each hole 274j is configured to receive a respective pin 274k (e.g., dowel pin or the like) within the bore formed by the hole 274j. In embodiments, coupling the pins 274k to corresponding cam holder holes 274j can secure or stabilize the connection between the cam holder stem 278 and the cam holder 274 at least because the pins 274k are configured to counter forces applied substantially perpendicular to the pins 274k, such as, for example, during removal of the actuating shaft 272 from the cam holder 274.

For example, as shown in FIGS. 10 and 13A, each hole 274j has a top opening formed through a top surface of the cylindrical outer surface 274c of cam holder 274 and a bottom opening formed through a bottom surface of the cylindrical outer surface 274c. The top and bottom openings of each hole 274j are axially aligned (e.g., along a vertical axis, x) and define opposite ends of the cylindrical bore formed by the hole 274j, so that the pin 274k inserted into the hole 274j can extend through the cam holder 274. For each hole 274j, a distance (d) between the top opening and the bottom opening of the hole 274j along the respective vertical axis (x) may be selected based on a length of the pins 274k. In the illustrated embodiment, the distance (d) is selected to be less than the length of the pins 274k, so that the top and bottom portions of the pin 274k can extend out from respective openings of the hole 274j and into the valve body 110, for example, as shown in FIG. 10.

Moreover, each hole 274j may be sized, shaped, or otherwise configured to receive either of the pins 274k, which may be substantially identical, and form an interference fit, friction fit, or other secure attachment to the received pin 274k. For example, each hole 274j may have a diameter that is selected to be at least slightly larger than a diameter of the pins 274k. In some embodiments, the pins 274k may have ridges or other outer configuration or shape and/or a textured outer surface to help further secure their attachment to the holes 274j. In addition, the pins 274k may be made of any suitable, sturdy material (e.g., metal) that can withstand stresses applied during operation.

Thus, using the above and/or other similar techniques, the pins 274k can be configured to lock the cam holder 274 into place, or otherwise prevent (accidental) disconnection of the cam holder 274 from the cam holder stem 278 (or vice versa), for example, during removal of the actuating shaft 272 from the cam holder 274, or other maintenance or use operation. While two dowel pins 274k and two holes 274j are shown and described herein, in other embodiments, more or fewer pins and/or more or fewer holes may be utilized to stabilize the connection between the cam holder 274 and the cam holder stem 278.

As best shown in FIGS. 10, 11A, 11B, and 15, the threaded outer surface portion 278c at the second end of the cam holder stem 278 is threaded into valve body 110 to fixedly couple or attach cam holder stem 278 to valve body 110. In the illustrated embodiment, the tool engagement portion 278d of cam holder stem is configured as a hexagonal structure such that a wrench or other such tool can be used to thread or otherwise fixedly couple cam holder stem 278 to valve body 110. While cam holder stem 278 is depicted as a separate component herein, in other embodiments, cam holder stem 278 could be integrally formed as part of valve body 110, or otherwise securely connected to the valve body 110. In such cases, the cam holder stem 278 may not include the threaded outer surface portion 278c, for example. In some embodiments, cam holder stem 278 may be integrally formed with, or included as part of, the cam holder 274, so as to form a single component that can be securely coupled to the valve body 110, via the threaded engagement described herein or other secure engagement mechanism.

In summary, a first connection of the valve actuating assembly components is formed by removably coupling actuating shaft 272 to cam holder 274 via an interference fit or other such removable connection between the cam holder connection portion 272a of actuating shaft 272 and the actuating shaft receiving bore of cam holder 274. The non-cylindrical or non-circular shape of the cam holder connection portion 272a and the actuating shaft receiving bore enables cam holder 274 to correspondingly rotate with actuating shaft 272.

In addition, a second connection of the valve actuating assembly components is formed between the cam holder stem 278 and the cam holder 274. More specifically, the cylindrical cam holder engagement portion 278b of the cam holder stem 278 is coupled to the cylindrical stem receiving bore of the cam holder 274. Next, a pair of pins 274k are inserted into the holes 274j extending through the cylindrical outer surface 274c of the cam holder 274, such that the pins 274k are secured on either side of the cam holder stem 278, just behind the cylindrical engagement portion 278b. The connection of cam holder stem 278 and cam holder 274, via the pins 274k, enables cam holder 274 to rotate freely while the cam holder stem 278 is held stationary and does not rotate. Connection of the cam holder stem 278 to cam holder 274, via the pins 274k, also prohibits accidental removal of cam holder 274 from cam holder stem 278. The cam holder stem 278 provides support to cam holder 274 such that actuating shaft 272 can be removed from valve body 110 while cam holder 274 remains in place to hold and position the cam 276 within the valve body 110.

FIGS. 16A and 16B illustrate another exemplary cam holder 374 that may be included in the valve actuating assembly 270 shown in FIG. 10, in place of the cam holder 274, in accordance with embodiments. Similarly, FIGS. 17A and 17B illustrate another exemplary actuating shaft 372 that may be included in the valve actuating assembly 270 shown in FIG. 10, in place of the actuating shaft 272, in accordance with embodiments. The cam holder 374 and the actuating shaft 372 may be substantially similar to the cam holder 274 and the actuating shaft 272, respectively, both operatively and physically, except for an overall shape or configuration of the interface between the two components. For example, like the cam holder 274 and the actuating shaft 272, an actuating shaft receiving bore (not labeled) may be defined in a second end of the cam holder 374 and configured to receive a cam holder connection portion 372a of the actuating shaft 372 in order to securely connect the actuating shaft 372 to the cam holder 374, e.g., via an interference fit or other tight connection. Also like the cam holder 274 and the actuating shaft 272, the interface between the cam holder 374 and the actuating shaft 372, or a cross-section thereof, may be non-circular in order to enable the cam holder 374 to rotate along with the actuating shaft 372. What differs between the two embodiments, however, is the specific shape of that non-circular interface, or cross-section.

More specifically, as shown in FIG. 16A, the cam holder 374 has an outer size and shape that is generally similar to the outer size and shape of the cam holder 274 shown in FIG. 11A, but includes a plurality of inner surfaces 374a configured to define a non-circular actuating shaft receiving bore that has a different shape, or cross-section, than the square-shaped bore formed by the inner surfaces 274a of the cam holder 274. For example, as shown in FIG. 16B, the plurality of inner surfaces 374a may include three flat inner surface portions 374b for defining a top surface and two side surfaces of the actuating shaft receiving bore, and one curved or cylindrical inner surface portion 374c connected to the two side surfaces and defining a bottom surface of the bore. The actuating shaft receiving bore formed by the inner surfaces 374a may have, for example, an elongated D-shape, as illustrated, or any other non-circular shape.

Likewise, as shown in FIG. 17A, the actuating shaft 372 has an outer size and shape that is generally similar to the outer size and shape of the actuating shaft 272 shown in FIG. 12, except for a different-shaped cam holder connection portion 372a at the second end of the actuating shaft 372. More specifically, instead of having a square-shaped end like the cam holder connection portion 272a shown in FIG. 13C, the cam holder connection portion 372a of the actuating shaft 372 has a non-circular end shape that matches, or is substantially similar to, the shape (e.g., elongated D-shape) formed by the non-circular cross section of the actuating shaft receiving bore of the cam holder 374. For example, as shown in FIG. 17B, the cam holder connection portion 372a may include a cylindrical bottom portion 372c that defines an arcuate or curved surface (e.g., similar to the cylindrical outer surface portion 172c shown in FIG. 5), two flat side portions 372d that define respective flat rectangular surfaces, and a flat top portion 372e that also defines a flat rectangular surface (e.g., similar to the flat outer surface portion 172d shown in FIG. 5). As shown, the cylindrical portion 372c may be connected to the flat side portions 372d opposite the flat top portion 372e, so as to form an elongated D-shaped cross-section that is similar to the elongated D-shape of the actuating shaft receiving bore of cam holder 374, or can otherwise be operatively coupled to the cam holder 374.

It should be appreciated that the valve actuating assembles 170/270 described herein may include any suitable combination of the embodiments described herein. For example, in one embodiment, a valve actuating assembly includes a cam holder that has a D-shaped actuating shaft receiving bore, e.g., like the actuating shaft receiving bore formed by the plurality of inner surfaces 174a of the cam holder 174 shown in FIG. 6C, and an actuating shaft that has a corresponding D-shaped cam receiving portion, e.g., like the cam receiving portion 172a of the actuating shaft 172 shown in FIG. 5.

While specific embodiments have been described in detail, it will be appreciated by those skilled in the art that various modifications and alternatives to those presented herein could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A valve actuating assembly for actuating an internal valve between a closed position and an open position, the valve actuating assembly comprising:
    a cam holder stem securely connected to a valve body of the internal valve;
    a cam holder having a first end and a second end, the first end of the cam holder operably coupled to a portion of the cam holder stem to position the cam holder within the valve body of the internal valve;
    a cam operably mounted to the cam holder; and
    an actuating shaft extending through at least a portion of the valve body of the internal valve, the actuating shaft removably coupled to the second end of the cam holder such that the actuating shaft can be decoupled from the cam holder and removed from the valve body,
    wherein the cam holder and the cam are configured to remain connected to the cam holder stem and remain positioned within the valve body when the actuating shaft is decoupled from the cam holder and removed from the valve body.

2. The valve actuating assembly of claim 1, wherein the actuating shaft comprises a cam holder connection portion having a non-circular shape configured to removably couple the actuating shaft to a corresponding bore formed in the second end of the cam holder.

3. The valve actuating assembly of claim 1, further comprising a retaining ring configured to operably hold the cam to the cam holder, wherein the cam holder comprises a retaining ring groove defined in an outer surface of the cam holder and configured to receive the retaining ring.

4. The valve actuating assembly of claim 1, wherein the cam holder stem is configured to support the cam holder and the cam within the valve body when the actuating shaft is decoupled from the cam holder and removed from the valve body.

5. The valve actuating assembly of claim 1, further comprising a locking ring configured to operably attach the cam holder stem to the cam holder, wherein the cam holder stem comprises a locking ring groove defined in an outer surface of the cam holder stem and configured to receive the locking ring.

6. The valve actuating assembly of claim 1, further comprising a plurality of pins coupled to holes extending through an outer surface of the cam holder, the plurality of pins being configured to operably secure the cam holder to the cam holder stem.

7. The valve actuating assembly of claim 1, wherein the cam includes a non-circular bore configured to receive a non-circular end of the cam holder.

8. The valve actuating assembly of claim 7, wherein the non-circular end of the cam holder includes a non-circular opening for receiving a cam holder connection portion of the actuating shaft.

9. The valve actuating assembly of claim 1, wherein the cam holder stem comprises: a first end operably coupled to the first end of the cam holder, and a second end threadably engaged to the valve body to secure the cam holder stem to the valve body.

10. A valve actuating assembly for actuating an internal valve between a first position and a second position, the valve actuating assembly comprising:
- a cam holder positioned within a valve body of the internal valve;
- a cam operably coupled to the cam holder and configured to engage a valve stem of the internal valve for moving the internal valve between the first position and the second position; and
- an actuating shaft extending through at least a portion of the valve body of the internal valve, rotation of the actuating shaft causing rotation of the cam holder and the cam,
- wherein the actuating shaft is removably coupled to the cam holder such that the actuating shaft can be decoupled from the cam holder and removed from the valve body, and
- wherein the cam holder and the cam are configured to remain positioned within the valve body of the internal valve when the actuating shaft is decoupled from the cam holder and removed from the valve body.

11. The valve actuating assembly of claim 10, wherein the actuating shaft comprises a cam holder connection portion having a non-circular shape configured to removably couple the actuating shaft to a corresponding bore formed in the cam holder.

12. The valve actuating assembly of claim 10, further comprising a retaining ring configured to operably hold the cam to the cam holder, wherein the cam holder comprises a retaining ring groove defined in an outer surface of the cam holder and configured to receive the retaining ring.

13. The valve actuating assembly of claim 10, further comprising a cam holder stem operatively coupled to the cam holder and the valve body, wherein the cam holder stem is configured to support the cam holder and the cam within the valve body when the actuating shaft is decoupled from the cam holder and removed from the valve body of the internal valve.

14. The valve actuating assembly of claim 13, further comprising a locking ring configured to operably attach the cam holder stem to the cam holder, wherein the cam holder stem comprises a locking ring groove defined in an outer surface of the cam holder stem and configured to receive the locking ring.

15. The valve actuating assembly of claim 13, further comprising a plurality of pins coupled to holes extending through an outer surface of the cam holder, the plurality of pins being configured to operably secure the cam holder to the cam holder stem.

16. The valve actuating assembly of claim 13, wherein the cam holder stem comprises: a first end operably coupled to a first end of the cam holder, and a second end threadably engaged to the valve body of the internal valve to secure the cam holder stem to the valve body.

17. The valve actuating assembly of claim 10, wherein the cam includes a non-circular bore configured to receive a non-circular end of the cam holder.

18. The valve actuating assembly of claim 17, wherein the non-circular end of the cam holder includes a non-circular opening configured to receive a cam holder connection portion of the actuating shaft.

19. An internal valve for conveying fluid, the internal valve having a closed position and an open position, the internal valve comprising:
- a valve body comprising a plurality of inner surfaces that define a passage through the valve body, a valve seat disposed adjacent an inlet of the passage, a valve stem, and a poppet connected to and moveable with the valve stem between a first position in which the poppet sealingly engages the valve seat and a second position in which the poppet is disengaged from the valve seat; and
- a valve actuating assembly operatively engaged to the valve stem to move the valve stem and the poppet between the first position and the second position, the valve actuating assembly comprising:
  - a cam holder positioned in the passage of the valve body,
  - a cam operably coupled to the cam holder and engaged with the valve stem,
  - an actuating shaft extending through a portion of the passage and removably coupled to the cam holder, and
  - a cam holder stem configured to securely couple the cam holder to the valve body,
  - wherein rotation of the actuating shaft causes a rotation of the cam holder and the cam to cause the valve stem and the poppet to move between the first position and the second position, and
  - wherein the cam holder and the cam remain positioned in the passage and engaged to the valve stem when the actuating shaft is decoupled from the cam holder and removed from the portion of the passage.

20. The internal valve of claim 19, wherein the cam holder stem is configured to support the cam holder and the cam within the valve body when the actuating shaft is decoupled from the cam holder and removed from the portion of the passage.

* * * * *